United States Patent [19]

Edwards et al.

[11] 4,175,399
[45] Nov. 27, 1979

[54] CLOSED LOOP AIR CONDITIONING SYSTEM HAVING AUTOMATIC PRESSURIZING MEANS FOR VARIATION OF HEAT RATE

[75] Inventors: Thomas C. Edwards, Cocoa Beach; Amir L. Ecker, Cocoa, both of Fla.

[73] Assignee: The Rovac Corporation, Rockledge, Fla.

[21] Appl. No.: 769,958

[22] Filed: Feb. 18, 1977

[51] Int. Cl.² .............................................. F25D 9/00
[52] U.S. Cl. ........................................ 62/172; 62/402
[58] Field of Search ................. 62/149, 172, 174, 402, 62/87, 77

[56] References Cited

U.S. PATENT DOCUMENTS

| | | | |
|---|---|---|---|
| 2,475,077 | 7/1949 | Clancy | 62/62 |
| 2,715,317 | 8/1955 | Rhodes | 62/149 |
| 3,813,893 | 6/1974 | Gemender et al. | 62/149 X |
| 3,967,466 | 7/1976 | Edwards | 62/402 |

Primary Examiner—William E. Wayner
Attorney, Agent, or Firm—Leydig, Voit, Osann, Mayer & Holt, Ltd.

[57] ABSTRACT

An air conditioning system for an enclosed space including a jointly driven compressor and expander of the positive displacement type each having an inlet port and an outlet port with a primary heat exchanger connected between the compressor outlet port and expander inlet port and a secondary heat exchanger connected between the expander outlet port and the compressor inlet port to complete a closed loop having a charge of air and with one of the heat exchangers being thermally coupled to the enclosed space. Ambient air is injected into the closed loop to raise the pressure in the secondary heat exchanger to substantially above the atmospheric level to increase the heat rate of the system. Alternatively air is bled from the loop to reduce the pressure in the secondary heat exchanger thereby to decrease the heat rate of the system. In an alternate embodiment a source of pressurized air is provided, preferably in the form of an accumulator, with valving to feed air from the accumulator into the loop. While the system may be manually controlled, it is one of the features of the invention that injection and bleeding are under the automatic and corrective control of a temperature pressure sensing device so that the heat rate of the system is varied automatically in accordance with the requirements of an enclosed space for automatic maintenance of a present condition.

16 Claims, 35 Drawing Figures

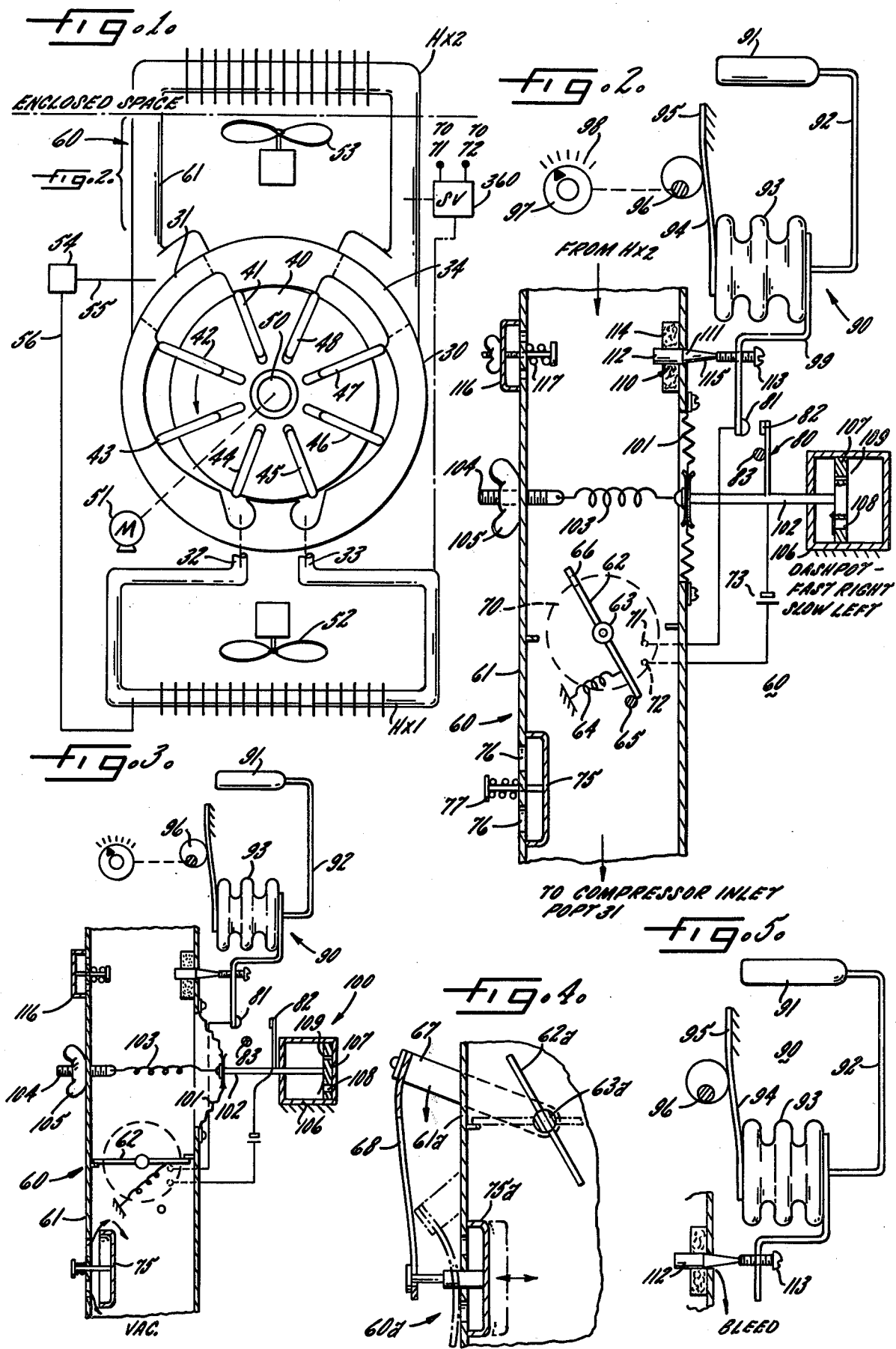

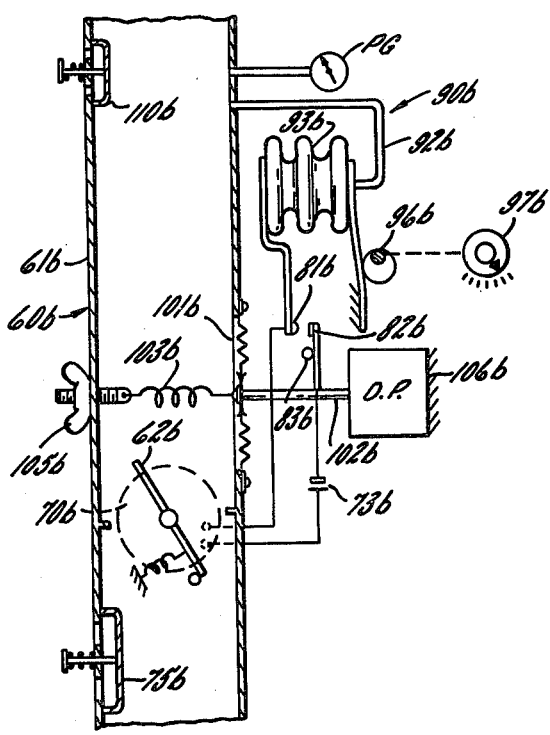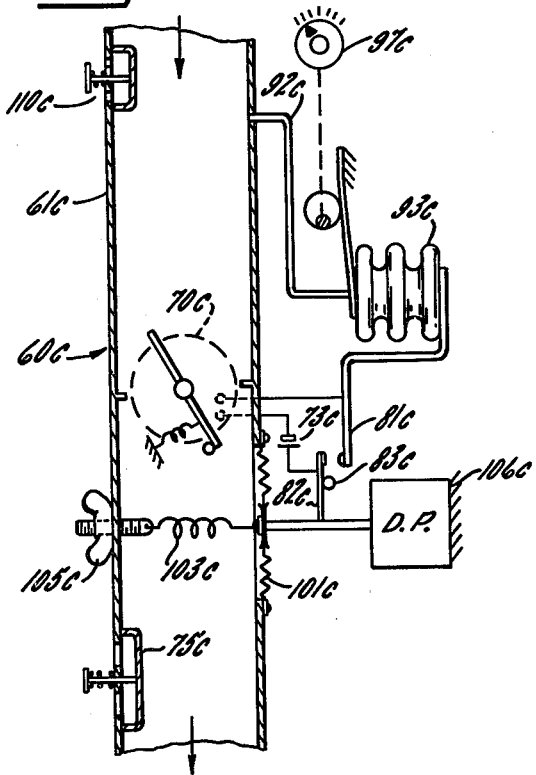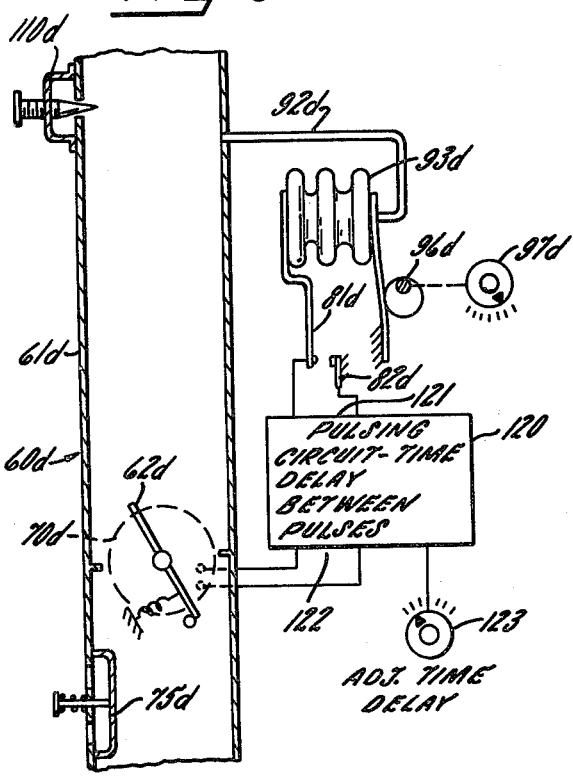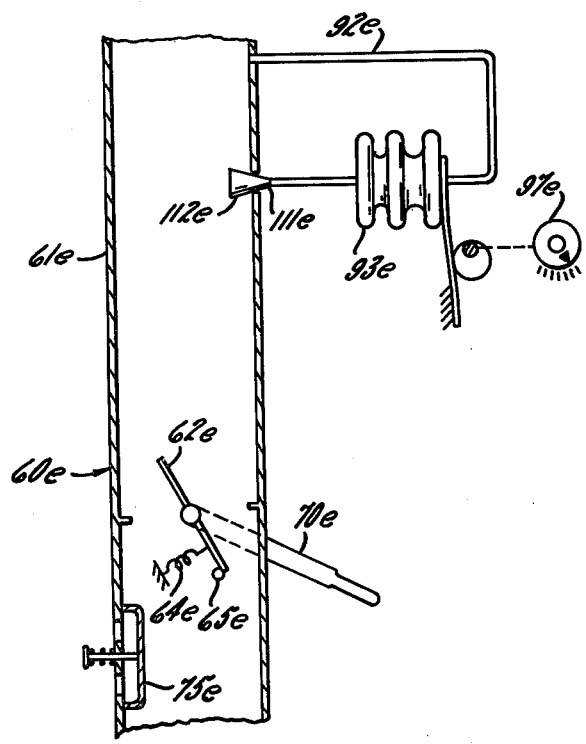

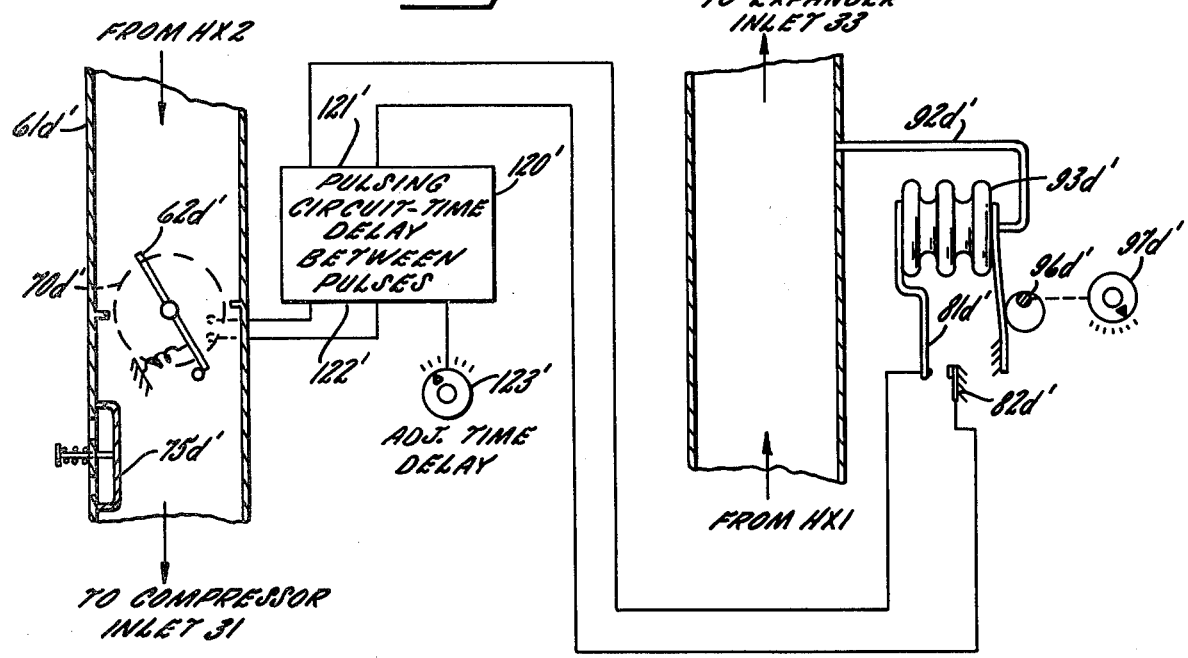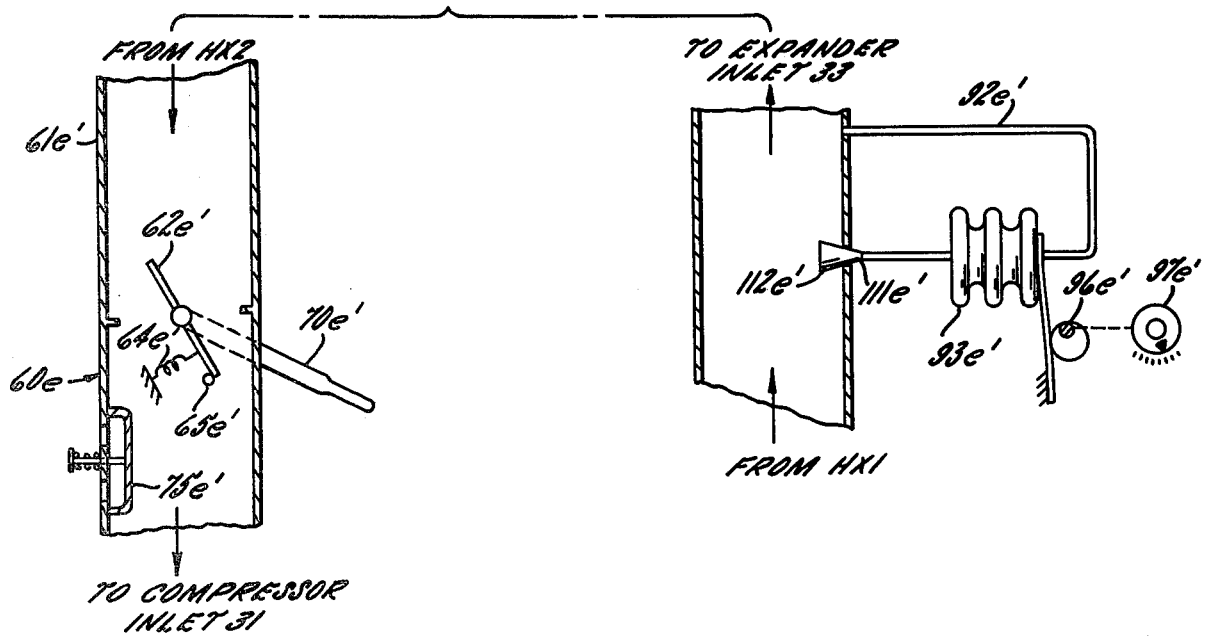

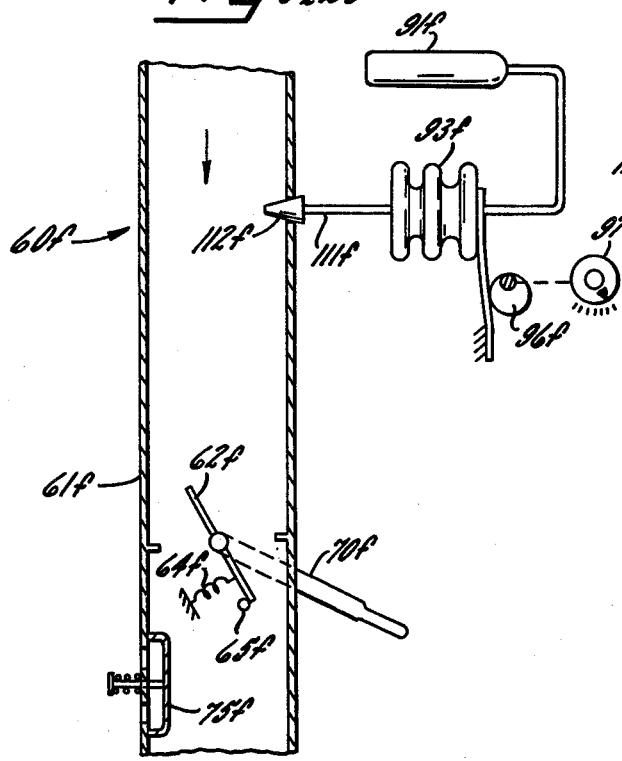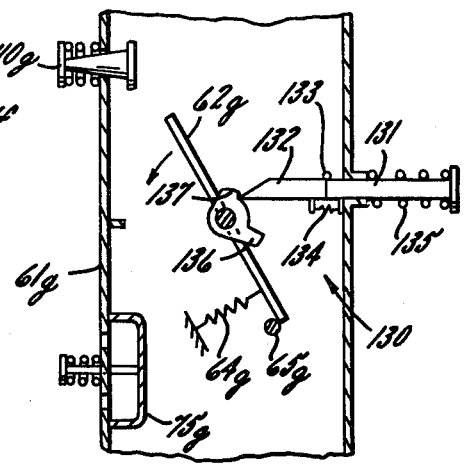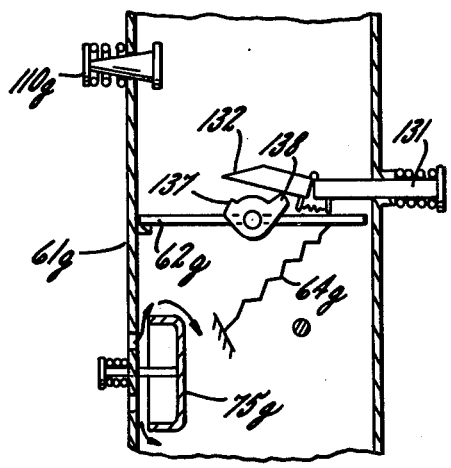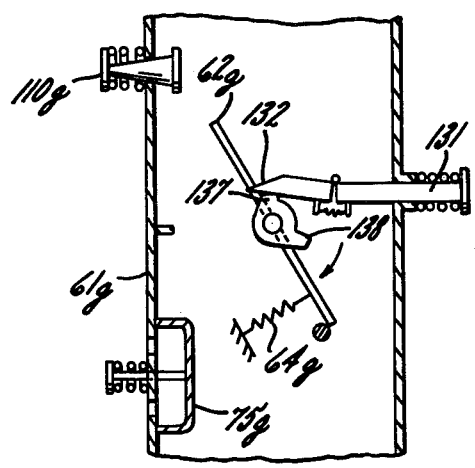

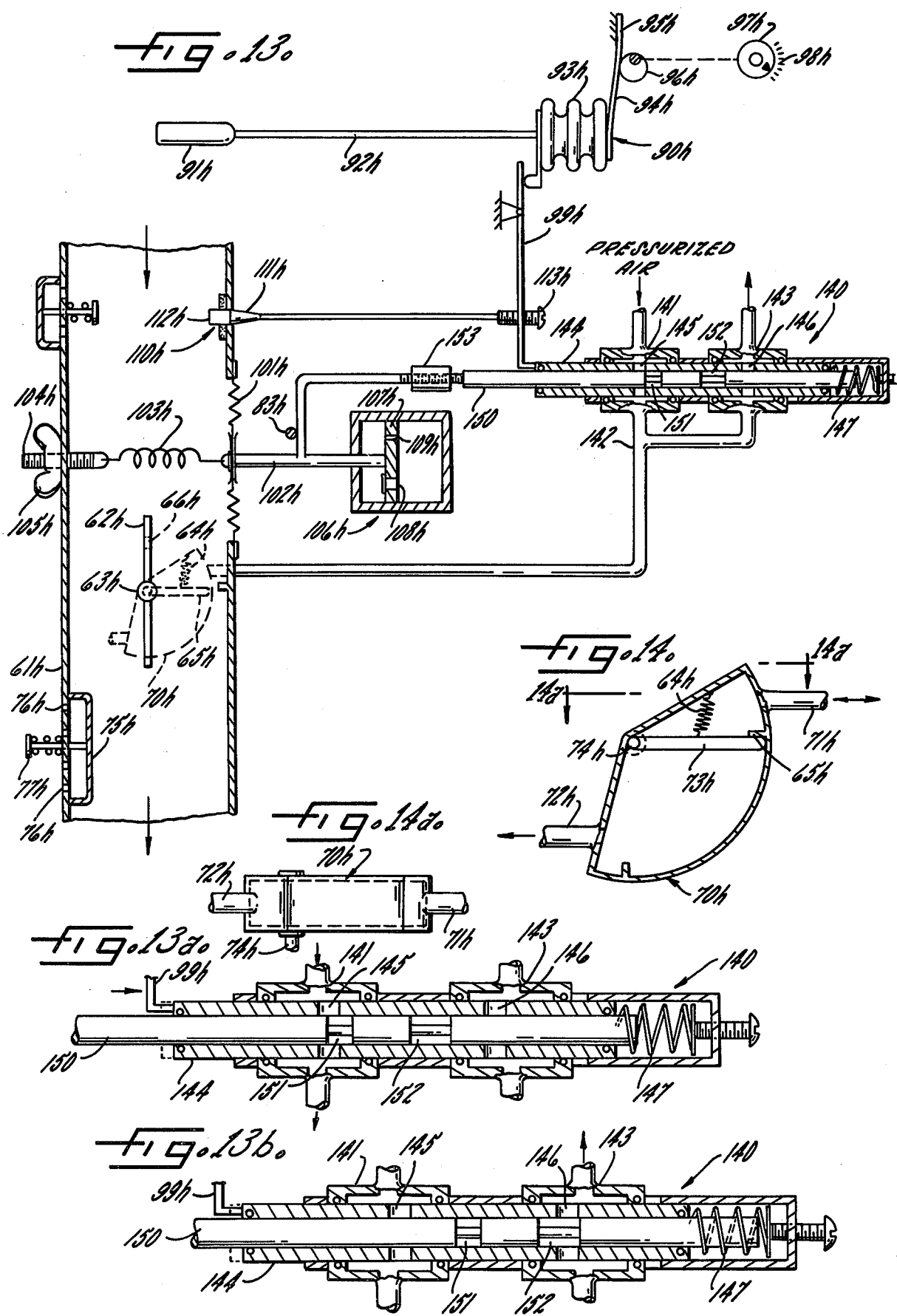

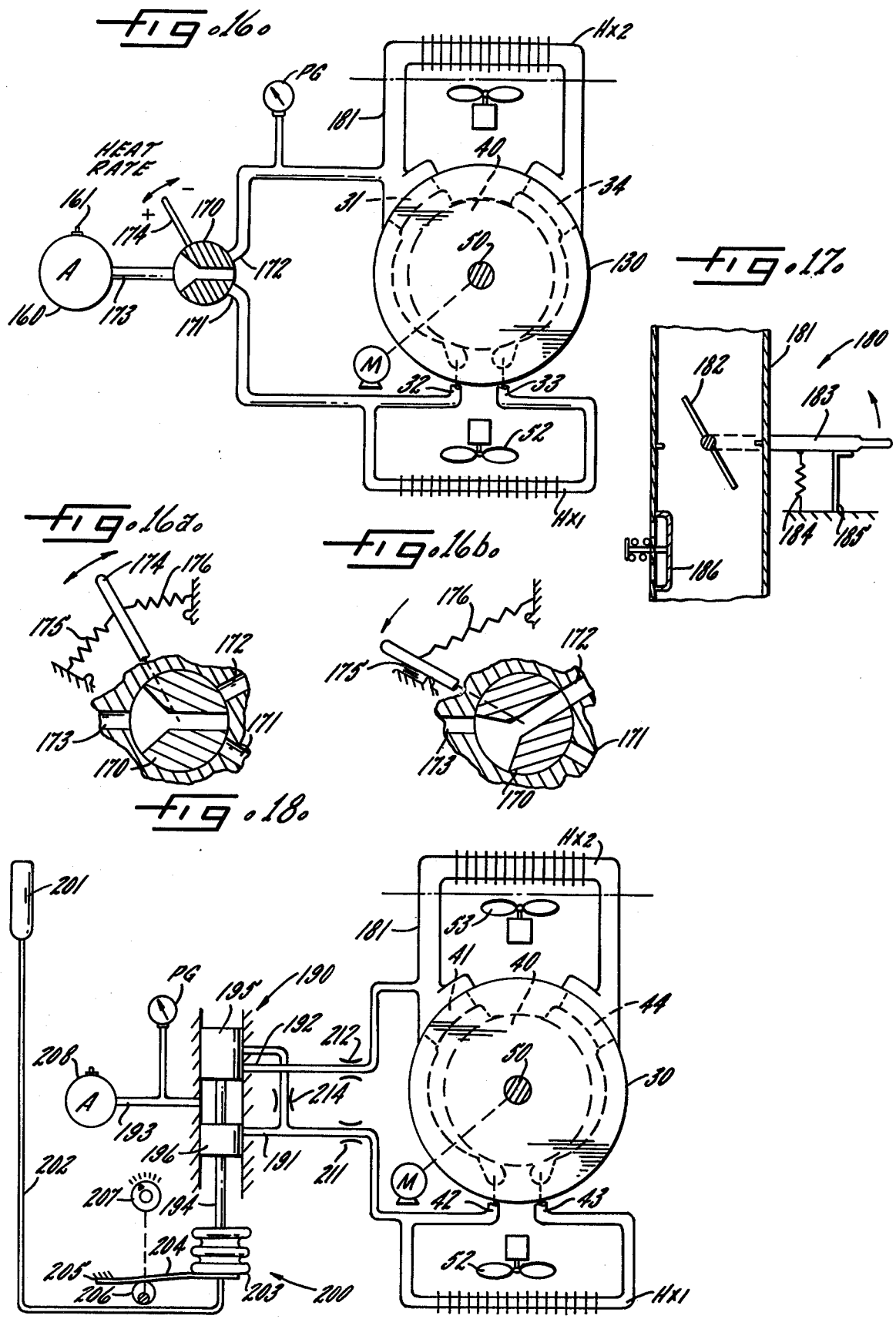

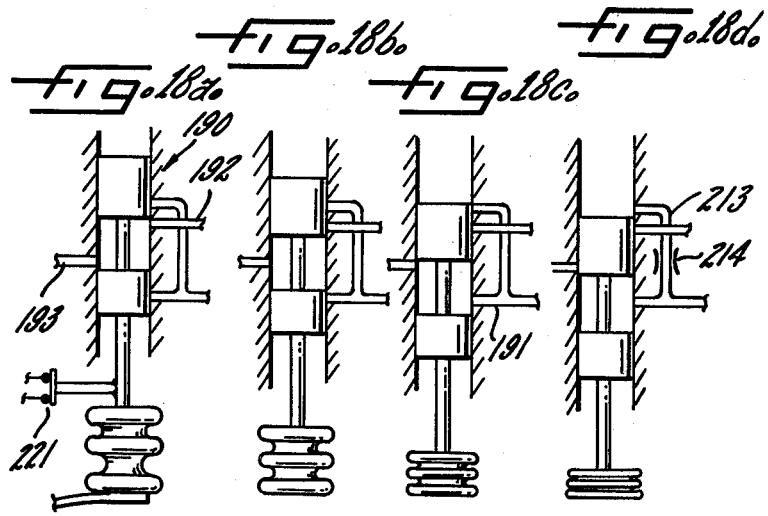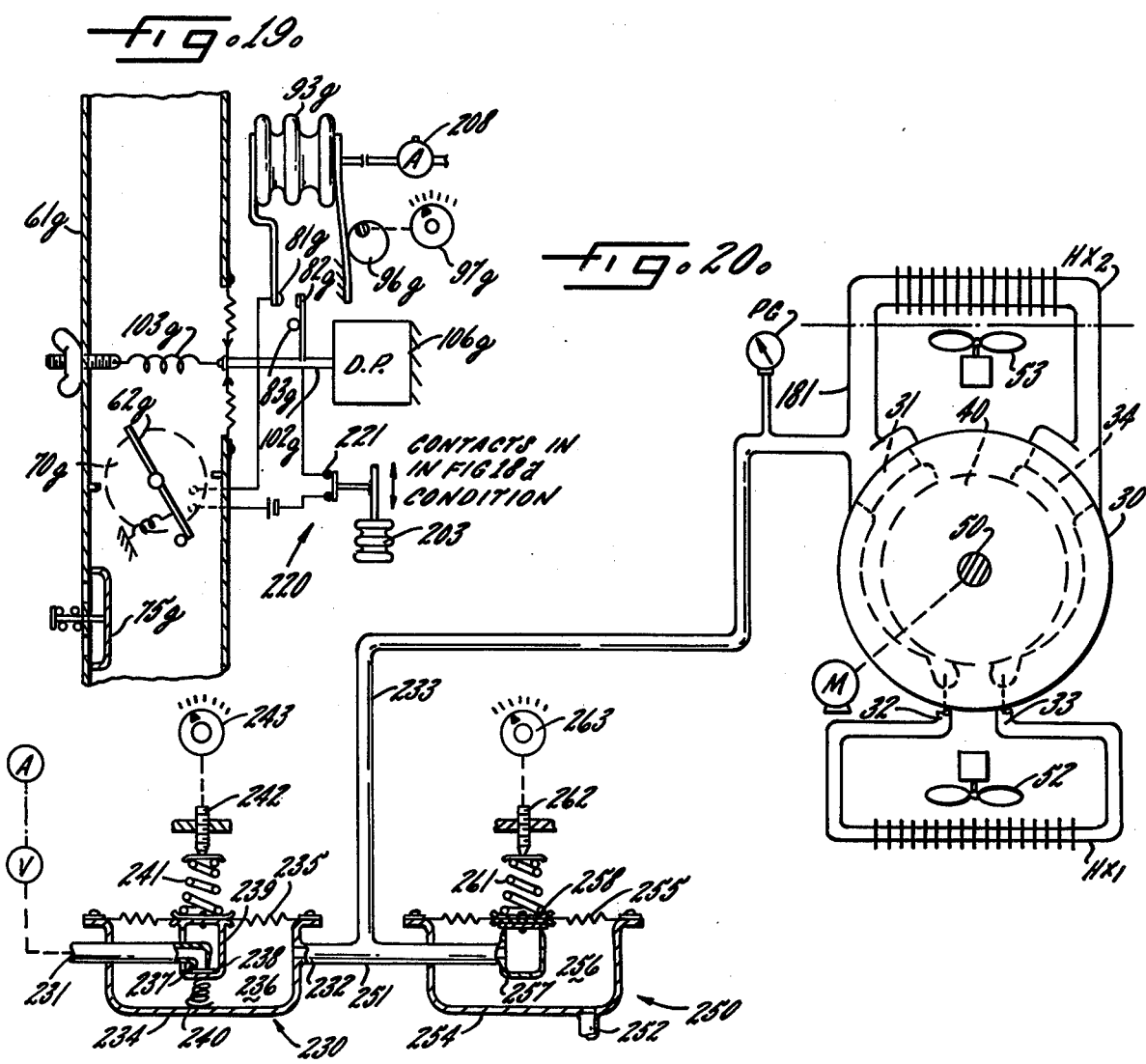

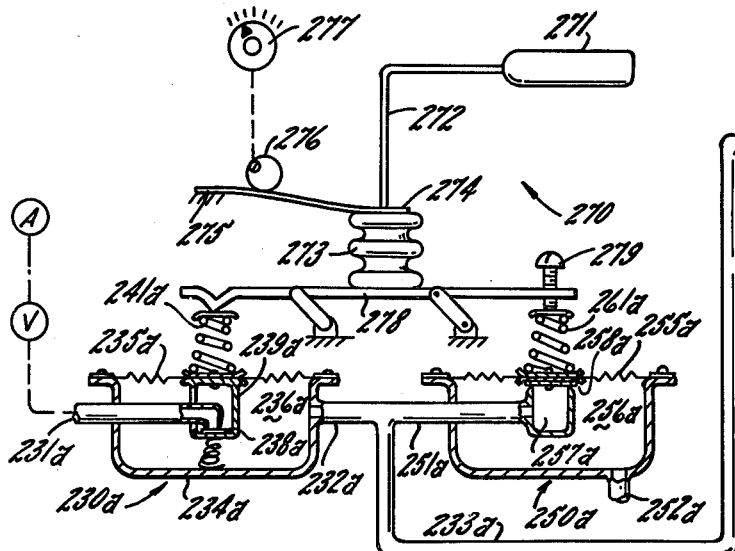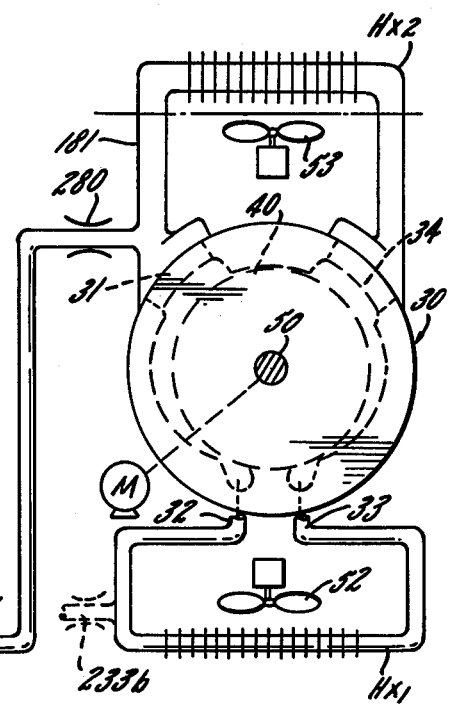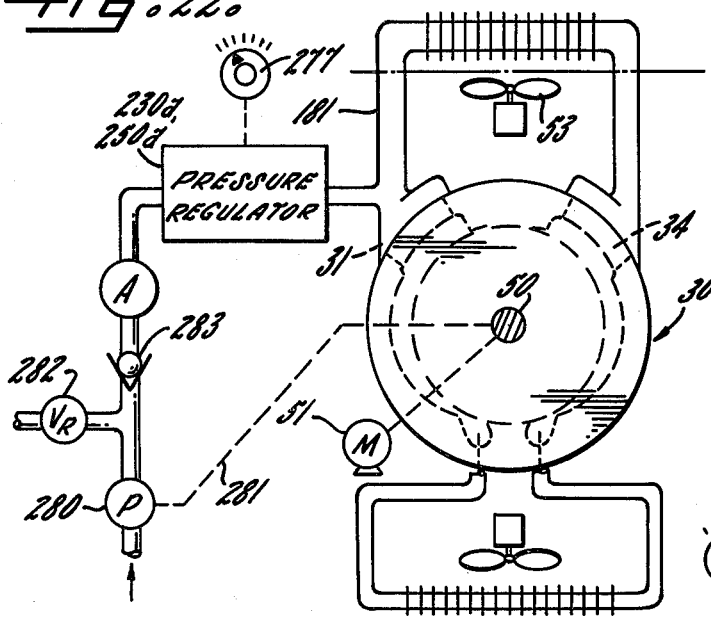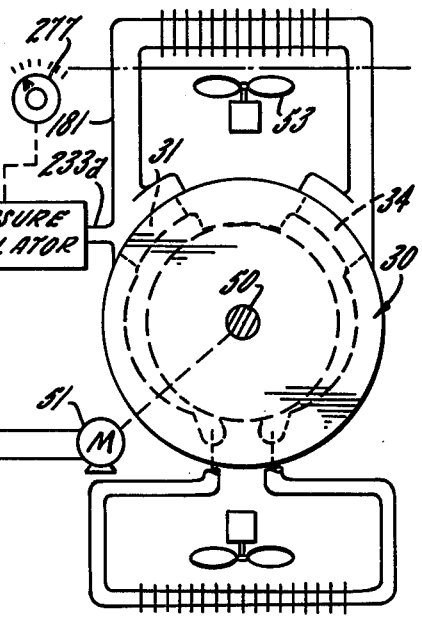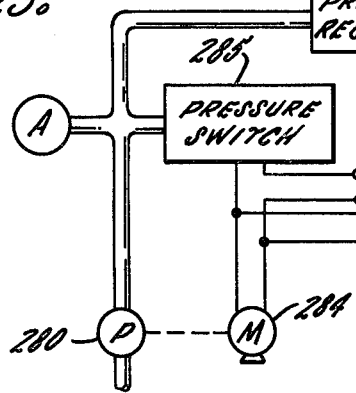

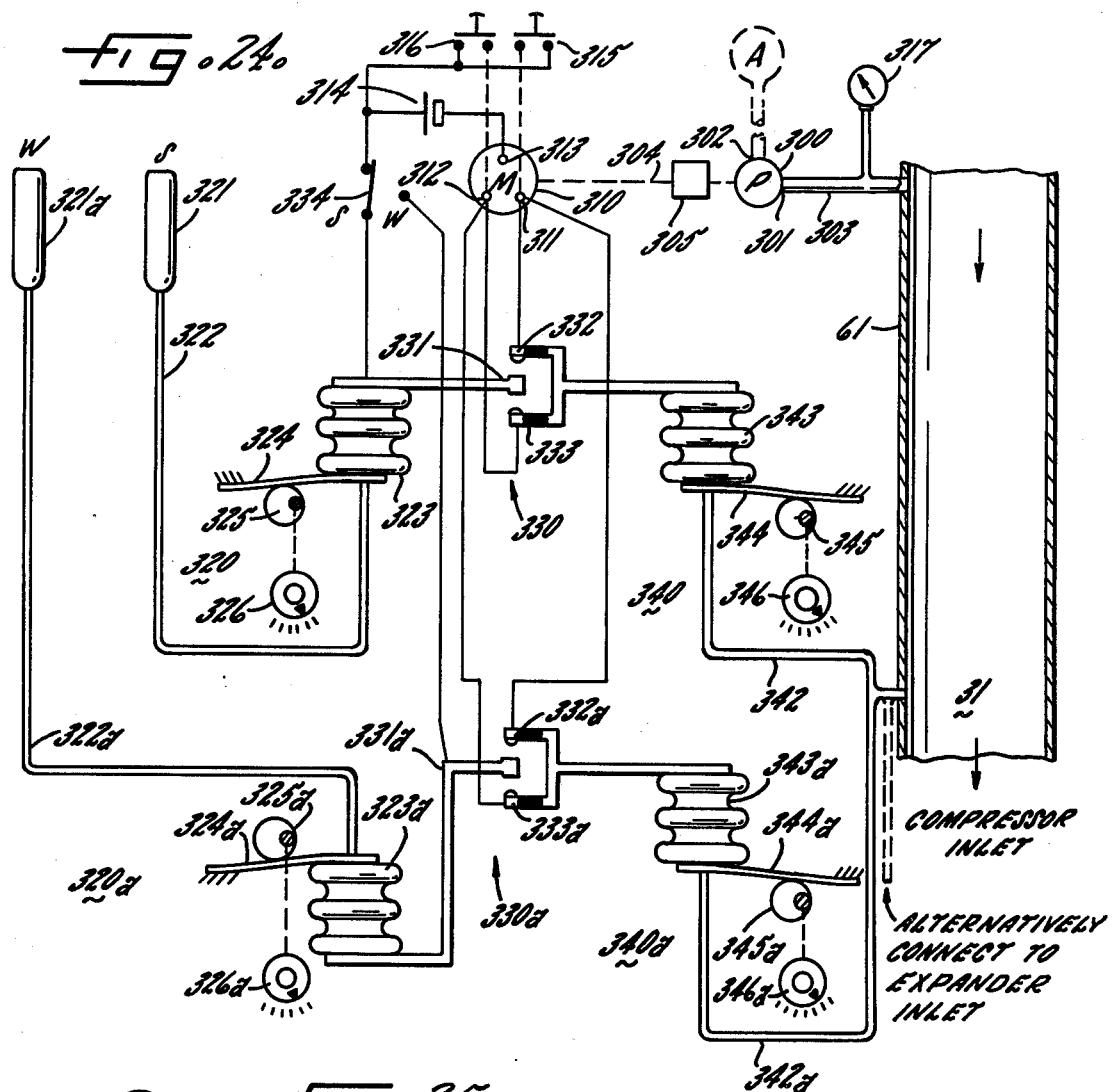
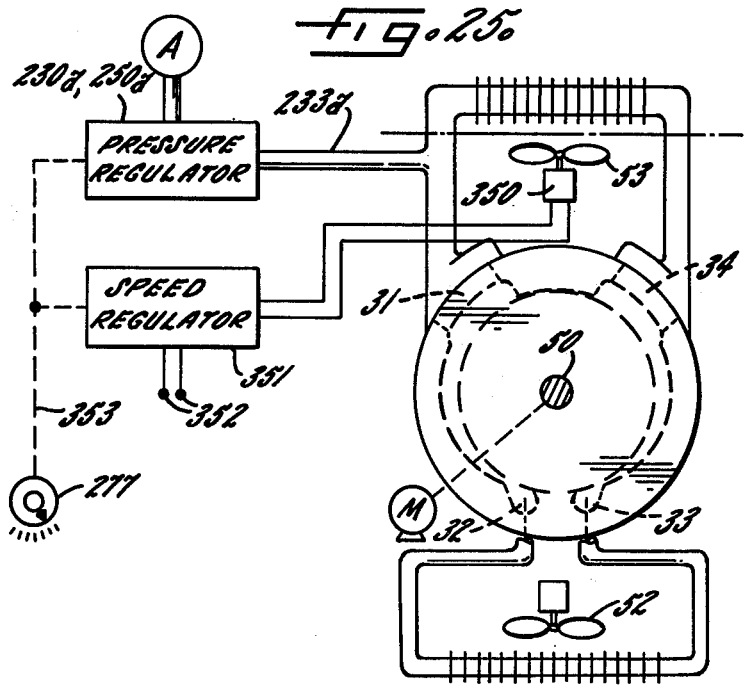
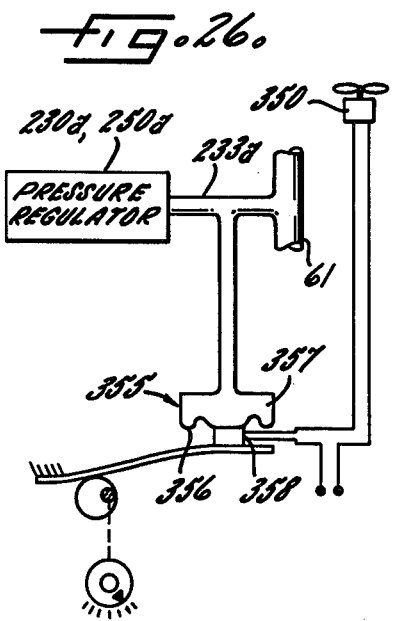

CLOSED LOOP AIR CONDITIONING SYSTEM HAVING AUTOMATIC PRESSURIZING MEANS FOR VARIATION OF HEAT RATE

In my prior U.S. Pat. Nos. 3,913,351 which issued Oct. 21, 1975 and 3,967,466 which issued July 6, 1976 there is disclosed an air conditioning system formed of a compressor and expander of the positive displacement type, drivingly coupled together, and each having inlet and outlet ports. The system may be either operated in the "open" condition with a primary heat exchanger connected between the compressor outlet port and the expander inlet port or in "closed" condition with a secondary heat exchanger connected between the expander outlet port and the compressor inlet port to complete a closed loop, with one of the heat exchangers being thermally coupled to the enclosed space depending upon whether the system is intended for production of heat or cold.

It is an object of the invention to improve the operation of such a compressor-expander both in multiplying the thermal capacity or heat rate and in the ease of automatic and manual control, with the heat rate being continuously variable over an extremely broad range making the device capable of satisfying a wide range of demand. For example, the same device can be used in a winter-summer air conditioning system in which the required heat rate is several times greater in the winter, for heating, than it is in the summer for cooling.

it is a more specific object of the present invention to provide means for operating the system, in closed condition, at a pressure which may substantially exceed atmospheric pressure and which, indeed, may be smoothly varied from a point substantially below atmospheric pressure, corresponding to a low heat rate to a point which may be as high as five or even ten atmospheres with a heat rate proportionately greater than that obtainable where the same device is operated, either closed or open, with atmospheric pressure existing in the secondary heat exchanger. It is, accordingly, an object of the invention to provide an air conditioning system for producing heat or cold having a size and weight which is only a small fraction of that of a conventionaly device. Not only is the present system more compact than existing systems of the same thermal capacity but it is much more efficient, with an increase in system pressure bringing about a proportionate improvement in thermal capacity without paying the price in terms of correspondingly increased losses and friction.

It is another object of the present invention to provide novel means for increasing the operating pressure in either of two different ways: by providing an auxiliary high pressure source for injection of air or by use of a special valving arrangement resulting in aspiration of air into a normally pressurized system. Thus it is an object to provide an air conditioning system which is dependent upon increasing and decreasing the pressure over a multiple-atmosphere range but in which the air required to bring about an increase in pressure is "boot strapped" into the system thereby making it unnecessary to use an accumulator or other pre-pressurized source.

It is an object of the invention in one of its aspects to provide an air injection mechanism in which the injection itself is accomplished efficiently and without any substantial throttling of the air stream within the enclosed heat-exchanging loop.

It is another object to provide means for increasing the heat rate of a compressor-expander which, in each of its embodiments, is simple and inexpensive. For example, where the added air is injected by aspiration, all that is required is a blocking valve and an aspirating valve, both of simple straightforward construction. Where the air is injected from a pressurized source, the pressurized source may be in the form of a simple and economical accumulator. In both cases reduction and pressure is simply obtained by providing, at some point in the loop, a bleed valve which may be equated to a controlled "leak".

It is an object of the invention, in this connection, to provide a system which operates with an economy of added air and in which the air which is bled or leaked from the system, to produce a decrease in pressure, is not idly discharged into the atmosphere but is stored for subsequent injection, that is, recycled.

It is another general object of the present invention to provide means, in a compressor-expander, for injection of air to greatly increase the system operating pressure which may be controlled either manually or automatically. Where manual control is desired as, for example, in a simple form of automobile air conditioner, the controls requiring manipulation are both simple and convenient. In a more sophisticated version of the present invention the same basic controls, for the injection or alternative bleeding of air, are simply coupled to a temperature responsive device, which may be a conventional thermostat, to produce corrective upward and downward adjustment of pressure, and hence heat rate, thereby automatically conforming the heat rate of the device to the heat or cold requirements of the space for automatic maintenance of a set temperature. Indeed, it is one of the features of the present system that a wide variety of controls may be utilized, from the simple on-off control of a wall type thermostat to a more precise proportionately modulated control in which the heat rate of the device varies in accordance with the degree that the temperature departs from the set level.

More specifically it is an object to provide an air conditioning system with automatic means for varying the pressure and hence the heat rate of the system and in which pressure follow-up is provided in the control means to improve the modulation of the heat rate and to prevent overshoot without necessity for employing a wide "dead band".

Other objects and advantages of the invention will become apparent upon reading the attached detailed description and upon reference to the drawings in which:

FIG. 1 is a diagram showing a compressor-expander connected to form a closed system with primary and secondary heat exchangers and to which the present invention is applicable.

FIG. 2 is a cross sectional view of a novel control assembly applicable to FIG. 1 and on a somewhat larger scale, the device being intended for temperature control in the refrigeration mode.

FIG. 3 is a view similar to FIG. 2 and showing corrective injection of air into the system upon increase in the temperature of the controlled space.

FIG. 4 is a fragmentary view showing a positively actuated injector valve usable in FIG. 2.

FIG. 5 shows the bleeding of air from the system upon a drop in temperature below the set point.

FIG. 6 shows a simplified control assembly with air injection similar to FIG. 2 but connected to maintain a predetermined pressure in the system and with provision for manual bleed.

FIG. 7 shows a control assembly performing the functions of FIG. 6 but in which the diaphragm used to achieve momentary response is on the downstream side of the blocking valve.

FIG. 8 shows a control assembly similar to FIGS. 6 and 7 but employing an adjustably timed pulsing circuit to achieve momentary actuation of the blocking valve and utilizing constant bleed.

FIG. 9 shows a simplified control arrangement providing for manual injection and pressure-actuated bleed.

FIGS. 10 and 11 correspond to FIGS. 8 and 9 as examples of pressure sensing on the high pressure side.

FIG. 12 is a further simplified system employing manual injection and temperature actuated bleed.

FIG. 13 shows an assembly similar to FIG. 2 but with pneumatic actuation of the blocking valve.

FIGS. 13a and 13b are enlarged stop motion views of the control valve turning the actuator on and off respectively.

FIGS. 14 and 14a show the pneumatic, valve type actuator, FIG. 14a being viewed along the correspondingly membered line in FIG. 14.

FIG. 15 shows a manual one-shot blocking valve and FIGS. 15a, 15b are stop motion views thereof.

FIG. 16 shows a compressor-expander system showing use of an accumulator for injection of air and for retrieval of air bled from the system.

FIG. 16a shows a control valve usable in the system of FIG. 16 with spring-centering.

FIG. 16b shows the valve in injection position.

FIG. 17 shows a simplified manual injector usable in the system of FIG. 16 for replenishing the accumulator.

FIG. 18 shows a compressor-expander system similar to FIG. 16 but having provision for corrective modulation of system pressure as a function of temperature.

FIGS. 18a–18d are stop motion views showing the position of the valve in FIG. 18 at four different temperatures with resulting corrective action.

FIG. 19 shows injector means usable in the system of FIG. 18 to provide automatic replenishment of air in the accumulator.

FIG. 20 shows a compressor-expander system providing automatic injection of air via an adjustable pressure regulator valve with bleeding of air by a pressure relief valve.

FIG. 21 is a system similar to FIG. 20 but showing control of both of the valves automatically as a function of temperature.

FIG. 22 is a diagram showing use of a close coupled air pump for replenishing the accumulator in FIG. 21.

FIG. 23 shows a system similar to FIG. 22 but with the auxiliary pump driven by a separate motor to provide replenishment upon demand.

FIG. 24 is a schematic diagram of an automatic temperature control system utilizing the same pumping means, operated reversely, for bleeding as for injection and including pressure follow-up to improve the modulation and to prevent overshoot.

FIG. 25 shows adjustment of the speed of the ventilating fan in accordance with the pressure in the system.

FIG. 26 shows automatic control of motor speed with system pressure utilizing a carbon pile transducer.

While the invention has been described in connection with certain embodiments, it will be understood that we do not intend to be limited to the particular embodiments shown but intend, on the contrary, to cover the various alternative and equivalent forms of the invention included within the spirit and scope of the appended claims.

Turning now to FIG. 1 there is shown, in simplified schematic form, a compressor-expander air conditioning system which may be utilized either for its refrigeration effect or, as the heat pump, for warming an enclosed space. The system includes a combined compressor-expander 30 which may be constructed as set forth in my prior U.S. Pat. Nos. 3,904,327; 3,956,904 and 3,967,466. It will suffice for present purposes to say that the compressor-expander includes a vaned rotor rotating in an elliptical chamber, the chamber forming a compressor side having inlet and outlet ports 31, 32 and an expander side having inlet and outlet ports 33, 34. The rotor, indicated at 40, has a set of vanes 41–48, the rotor being driven by a shaft 50 connected to a drive motor 51.

Connected between the compressor outlet port 32 and the expander inlet port 33 is a primary heat exchanger HX1 in which heat is liberated. Similarly, connected between the expander outlet port 34 and the compressor inlet port 31 is a secondary heat exchanger HX2 in which heat is absorbed. Thus the system may be employed either as a refrigerator or as a heater depending upon whether the secondary heat exchanger or the primary heat exchanger is thermally coupled to the enclosed space. In the discussion which follows it will be assumed that the system is being employed for refrigeration effect, with heat exchanger HX2 in the enclosed space and the heat exchanger HX1 located in the ambient atmosphere. The heat exchangers each may be provided with air circulating fans indicated at 52, 53 as is well known in the art.

In operation, with the compressor-expander 30 and the heat exchangers connected in a closed loop with a contained charge of air, and with the rotor 40 rotated in a counterclockwise direction, air is drawn into the compressor inlet port 31 and into the space defined by adjacent vanes, for example the vanes 41, 42. The air, while it is held captive, is compressed and exits in a compressed and heated state from the compressor outlet port 32 into the primary heat exchanger HX1 where the heat is carried away by the air currents generated by fan 52. The air in the heat exchanger, still compressed, but now at a temperature only slightly greater than ambient, is discharged into the inlet port 33 of the expander and positively expanded between adjacent vanes for exiting at the reduced, original, pressure, but now in a cold state, through the expander outlet port 34 into the secondary heat exchanger where heat is subtracted from the enclosed space with assistance from the circulating fan 53.

For further details of the construction and for further information concerning water injection, reference is made to the above-mentioned patents and to pending application Ser. No. 733,751 filed Oct. 26, 1976.

In accordance with the present invention means are provided for injection of air into the closed loop system for raising the pressure of the system substantially above atmospheric pressure thereby to produce a substantial increase in the heat rate of the system and, alternatively, for bleeding air from the system to reduce system pressure and thereby correspondingly reduce the heat rate, in contrast to the closed system disclosed in the patents mentioned above in which the heat rate, with the system operating closed, and with the secondary heat exchanger at substantially atmospheric pressure, is substantially equal to that obtained with the loop opened, at point of discharge 34, to the atmosphere. By "heat rate" is meant the number of BTU per unit time which can be liberated at the primary heat exchanger or absorbed at the secondary heat exchanger with a predetermined temperature differential existing between the enclosed space and the ambient atmosphere. Indeed, employing the present invention and with a pressure of, say, five atmospheres existing in the secondary heat exchanger, instead of one atmosphere as taught in the above patents, the effective thermal capacity of a compressor-expander of given size is multiplied by a factor of approximately five.

More specifically in accordance with the present invention, novel means are provided for controlling the pressure existing in the loop circuit, for example, by modulating the pressure correctively in accordance with the temperature in the enclosed space. In short the system is constantly and automatically adjusted, with temperature as the controlling factor, so that the amount of heat which is absorbed from the enclosed space is equal to the cooling requirement of the enclosed space necessary to maintain the set temperature. Stated in still other words, an increase in the temperature of the enclosed space is caused to bring about, more or less proportionately, an increase in the pressure of the enclosed loop, thereby to increase the heat transfer rate, that is, the rate of heat removal, so that the temperature is lowered back to the desired level, and with similar corrective action being effective upon a decrease in temperature below the desired level.

Still more specifically in accordance with the invention a blocking valve, associated with the secondary heat exchanger, is provided in the path of the air stream in the loop and an injector valve is provided adjacent the compressor inlet port capable of communication with the ambient atmosphere. Means are provided for momentarily closing the blocking valve thereby to create a vacuum at the compressor inlet port, the injector valve being coincidentally opened, so that additional air is aspirated to join that which is already present in the closed loop thereby to increase the pressure in the loop and increase the heat rate of the system.

A control assembly for accomplishing the injection of aspirated air is illustrated, in diagrammatic form to facilitate understanding, at 60 in FIG. 2. Here a length of conduit 61 is interposed between the secondary heat exchanger and the compressor inlet port 31. Extending crosswise in the conduit is a butterfly valve in the form of a circular plate 62 mounted upon a transversely extending shaft 63, the ends of which are suitably journaled in the opposed walls of the conduit. Means are provided for biasing the butterfly valve into the angled open position illustrated in FIG. 2. The biasing means may be in the form of a spring 64 with movement being limited by a stop 65. Alternately the butterfly valve may be biased to open position by slightly unbalancing the valve, by providing an aperture 66 in the upstream side thereof, so that the valve is, in effect, biased by the air stream.

For the purpose of rotating the butterfly valve to its blocking position a rotary solenoid 70 is provided having energizing terminals 71, 72, with current being supplied from a suitable source, here indicated as a battery 73.

Located at the downstream side of the blocking valve, and adjacent the inlet port 31, is an injector valve 75 having aspirating openings 76 and which is held in a normally closed position by means of a light return spring 77.

In carrying out the present invention, means are provided for momentarily energizing the solenoid 70, resulting in blockage of the air stream and injection of air, by aspiration, through the check valve 75. As shown in FIG. 2, the circuit to the solenoid is completed by means of a switch 80 having first and second contacts 81, 82 connected in series with the source of current. A thermostat is provided for causing the contacts to engage. The thermostat, indicated at 90, is made up of a bulb 91, a capillary tube 92 and a bellows 93, the latter element being charged with a volatile liquid so that any increase in the temperature at the bulb is accompanied by expansion of the bellows, and vice versa. For manually adjusting the temperature to be maintained, the bellows is mounted upon an arm 94 which is anchored at 95 and which is engaged by a cam 96 having a setting knob 97 which is positioned with respect to a calibrated scale 98. An arm 99 at the "free" end of the bellows carries the solenoid contact 81.

Accordingly, upon an increase in temperature at the bulb above the set point, the bellows expands, causing the contact 81 to move into engagement with the contact 82 thereby causing the vane 62 of the butterfly valve to move into the blocking position illustrated in FIG. 3. With normal flow from the secondary heat exchanger blocked off, the compressor inlet port 31 becomes starved for air, creating relative vacuum at the compressor inlet port and causing unseating of the check valve 75 so that additional air flows into the system.

It will be noted, however, that it is not necessary to employ a check valve as an injector valve in order to practice the present invention. If desired the injector valve may be positively actuated as illustrated in FIG. 4 in which corresponding parts are represented by corresponding numerals with addition of subscript a. Thus the shaft 63a of the butterfly valve is provided with a yoke 67 having an arm 68 which is captively connected to the outer end of the injector valve 75a. When the solenoid is energized it will be apparent that the counterclockwise rotation of the yoke 67 will cause the arm 68 to bear against the injector valve, permitting aspiration of air, and with the injector valve being closed when the butterfly valve rotates back to its normally open position.

In carrying out the invention the change in the pressure condition in conduit 61 resulting from the blockage is utilized to cause immediate separation of the electrical contacts and therefore immediate reopening of the blocking valve. This is preferably accomplished by coupling the second contact 82 to a diaphragm or other pressure responsive member located upstream from the blocking valve. The re-opening assembly, indicated generally at 100, includes a diaphragm 101 having a plunger 102 and which is inwardly biased by a spring 103, the spring having an adjusting screw 104 carrying an adjustable nut 105. To prevent immediate reclosure of the butterfly valve, which would result in rapid "telegraphing" movement, a dashpot 106 is provided having a piston 107. The space within the dashpot is occupied by a suitable fluid. "Fast right" and "slow left" operation are secured by incorporating in the piston a large flapper covered opening 108 and a smaller opening 109, the size of the latter determining the speed of return movement. A stop 83 determines the normal position.

Referring to FIG. 3, and considering a typical operating cycle, an increase in temperature causes initial engagement of contact 81 with contact 82, rocking the butterfly valve 62 into its blocking position and causing aspiration of air into the system. The sudden increase in pressure upstream of the butterfly valve, due to blockage, causes the diaphragm 101 and the plunger 102 thereof to move to the right, thereby causing contact 82 to "retreat" from contact 81. The dash pot 106 permits this movement to take place rapidly due to unseating at the flapper opening 108. Upon deenergization of the solenoid, the butterfly valve is restored, by reason of its biasing spring 64, to the open condition illustrated in FIG. 2. The opening movement may be achieved by a relatively light return spring because of the inherently balanced nature of a butterfly valve, particularly where an aperture 66 is provided in the upstream side of the vane.

With the pressure in the conduit 61 restored to its initial condition, the diaphragm 101 is drawn inwardly by spring 103 at a relatively slow rate determined by the dashpot. Such time delay gives time for the increased heat rate, due to the added air, to take effect, that is, to slightly reduce the temperature in the enclosed space. The time delay may, for example, be on the order of several seconds in duration. After such time interval, if the temperature in the space is still above the set value, restoration of the initial condition will again complete a circuit to the solenoid to produce a repeated cycle of movement of the blocking valve 62 and aspirating valve 75, resulting in a still further increase in system pressure and the initiation of a further delay time interval. Because of the momentary blockage only a relatively small amount of air enters the system with each closure of the blocking valve. In plain terms, the present invention contemplates the taking of small "sips" of air by the system rather than one large gulp, thereby tailoring the response of the system to the response of the enclosed space and its sensing thermostat to prevent temperature overshoot. In any event the butterfly valve, and its associated injector valve, will cycle repeatedly until the temperature in the space has been reduced to the set level. It will be understood by one skilled in the art that the illustrated form of dashpot is for explanatory purposes only and that normally a dashpot will be provided having provision for external adjustment of orifice size thereby to adjust the time interval. It will be further appreciated by one skilled in the art that other steps may be used to increase the response time of the control system as, for example, providing a restriction in the path of the aspirated air.

Further in accordance with the present invention means are provided, in the embodiment of FIG. 2, for automatic bleeding or air for corrective reduction in the heat rate of the system when the temperature in the enclosed space goes below the set level. This is accomplished by a bleed valve 110 which is formed by an opening 111 in the conduit, the opening being normally plugged by a bleed plunger 112 having an integral adjusting screw 113 which is threaded into the arm 99 on the bellows 93 of the thermostat. The plunger 112 is protected against foreign matter and is lubricated by surrounding it with a porous washer 114 which lies adjacent the inside wall of the conduit. The plunger 112 has a tapered section 115 which creates a "leak" when the plunger moves inwardly.

The effect of a decrease in temperature in the enclosed space below the set value will be apparent upon consideration of FIG. 5. The bellows 93 contracts moving the plunger 112 to the left and advancing the tapered portion 115 of the plunger into the opening causing a bleeding of air from the conduit. In the case of injection of air it will be recalled that steps were necessary to slow the degree of response of the control system. In the bleeding of air such tailored slowing of response is easily achieved by use of an extremely shallow taper at the tapered section 115. In short, the rate of bleed of air is slowed to a point which permits response of the space and its thermostat before any excessive amount of air has been bled from the system with the effect, again, of avoiding overshoot.

It will be seen, then, that the control assembly set forth in FIG. 2 provides a modulated control of heat rate over wide limits. Where the air conditioning system is used in an automobile which has been standing in the sun on a particularly hot day, the thermostat will "call for cold" until the compressor-expander has been pressurized to its upper limit, which may be on the order of five atmospheres in the second heat exchanger, causing immediate multiplication in the heat rate and bringing the temperature of the automobile down to a comfortable level within a very few minutes, following which there will be automatic bleeding of the pressure down to a more normal equilibrium, or running, level without any care or attention on the part of the driver. The great multiplication of thermal capacity is of equal advantage in bringing down the temperature of a dwelling on a hot day or in the cooling off a large quantity of perishables suddenly loaded in a refrigerator car or the like. For the purpose of limiting the maximum pressure which may be permitted in the loop of the system the conduit 61 may be fitted with a relief valve 116 having a return spring 117 and which acts as a pneumatic fuse. Indeed, the action is an improvement over that expected in a fuse, which is essentially a one shot device, since the relief valve is unseated and continues to act as long as the high pressure persists, causing the pressure to be accurately maintained at the limiting value until recovery of the system brings about a corrective reduction in the pressure.

While it is both possible and convenient to modulate the heat rate as a function of temperature, the invention is by no means limited thereto, and the control system illustrated in FIGS. 2-5 may be readily adapted to maintenace of a set pressure within the system, thereby to establish a maintained heat rate quite independently of temperature. Referring to FIG. 6 such a system is shown in which corresponding reference numerals are employed to indicated corresponding parts with addition of subscript b. The control system corresponds to that just described with two primary differences. In the first place, the thermostat 90 is replaced by a pressure detector generally indicated at 90b having a tube 92b which communicates with the interior of the conduit and a flexible bellows 93b which mounts the contact 81b. The second change is that a manually operated bleed valve 110b is substituted for the automatic bleed valve of the earlier embodiment.

Under conditions of equilibrium pressure in the conduit, the bellows 93b will be expanded sufficiently to keep the contacts out of engagement. However, if the pressure in the conduit should drop for any reason, for example, due to unintended leakage, the resultant contraction of the bellows 93b will cause a circuit to be completed to the solenoid 70b, with the result that the butterfly valve 62b is moved to blocking position resulting in aspiration through the check valve 75b. Just as in the preceding embodiment, the engagement of the electrical contacts is momentary because of the back pressure acting upon diaphragm 101b, with the butterfly valve being repeatedly cycled until the desired level of pressure is built up in the conduit. Because of the substantially immediate response in terms of developed pressure, the dashpot may be adjusted for more rapid return movement or, indeed, dispensed with completely.

In the system of FIG. 6, when it is desired to reduce the equilibrium pressure maintained in the system the calibrated control 97b is turned to a lower level. However, if the system is tight, this will not bring about an immediate reduction in system pressure. Consequently, a manual bleed valve 110b is provided which, when pressed, drops the system pressure (of the secondary heat exchanger) down to nearly atmospheric level. When such valve is released the system pressure builds up automatically and promptly to the new pressure level which has been set on the control knob. The manual bleed control 110b may therefore be aptly referred to as a "reset" control. For the purpose of the facilitating adjustment of the pressure setting knob 97b, or for calibrating such knob, a pressure gauge PG, which may be left permanently in the system, will be found helpful.

While the back pressure of the blocking valve may be conveniently utilized to restore the blocking valve promptly to open condition, as in the two embodiments just described, the invention is not limited thereto and the vacuum created on the downstream side of the blocking valve may be utilized for the purpose. This is illustrated in FIG. 7 in which corresponding parts are represented by corresponding numerals with addition of subscript c. Here it will be noted that the diaphragm 101c is mounted on the downstream side of the blocking valve 62c. Since the diaphragm is now responsive to vacuum, a compression spring 103c is substituted for the tension spring previously used and the retreating contact 82c is mounted for inward, rather than outward, retreat. The directionality of the movable contact 81c is also reversed. Thus in the event of a drop of pressure in the conduit, sensed by the bellows 93c, the contact 81c is drawn inwardly (to the left) into engagement with contact 82c, completing a circuit to the solenoid which snaps the butterfly valve to blocking position. The resulting vacuum draws the diaphragm 101c inwardly to separate the contacts. At the same time the back pressure expands the bellows 93c resulting in further separation. In any event the solenoid 70c is immediately de-energized, causing reopening of the butterfly valve and restoration of the initial positions of the diaphragm and bellows in readiness for an ensuing cycle which repeats until the pressure in the conduit (secondary heat exchanger) is automatically brought back to the set level.

Still other means may be provided for achieving momentary operation of the blocking valve as illustrated in FIG. 8 where corresponding reference numerals carry the subscript d. In this embodiment the diaphragm 101 has been omitted and the second contact 82d has been made stationary. To achieve momentary action of the solenoid a pulsing circuit 120 is used having terminals 121 and output terminals 122 as well as an adjusting knob 123 calibrated in units of time delay. While the schematic circuit has not been set forth, the pulsing circuit is of the conventional type in which making of contact between the input terminals 121 results in an immediate pulse at the output terminals 122, the output pulse being of sufficient length to produce a full closing cycle of the butterfly valve but with subsequent output pulses being separated by a predetermined delay interval in accordance with the setting of the control 123, the output pulses continuing until separation of the contacts 81d, 82d. Instead of employing a manually operated bleed valve for reset purposes it is possible, in a system such as set forth in FIG. 8, to employ constant bleed at a slow rate through adjustable orifice 110d. Thus when the manual control 97d is set to a lower value, the leakage occurring through the orifice 110d will, within a short time, bring the pressure down to the set value following which pressure will be maintained in the conduit by action of the butterfly valve as described.

In accordance with a still further aspect of the present invention air may be injected manually and bled automatically to the desired operating pressure. A system operating in this fashion is set forth in FIG. 9 in which corresponding parts carry the subscript e. In this embodiment the butterfly valve 62e is operated by a manual level 70e against the force of the biasing spring 64e and with the open position of the valve being determined by a limit stop 65e. Thus when the lever 70e is swung upwardly, the butterfly valve 62e moves into blocking position aspirating air through the injector valve 75e and raising the pressure level of the system. Assuming that the pressure level is raised beyond the pressure for which the setting knobs 97e has been set, the pressure applied to the bellows 93e will cause the bellows to expand moving the plunger 112e inwardly with respect to the orifice 111e, causing air to be bled from the conduit 61e, reducing the pressure in the bellows sufficiently to retract the plunger thereby to plug up the bleed opening so that operation occurs at a pressure and heat rate established by the setting knob.

In the embodiments discussed above the pressure sensing means is located in the low pressure side of the system. However the invention is not limited thereto and the pressure sensor may be located on the high pressure side preferably between the primary heat exchanger and the expander inlet port 33. This is shown by way of example in FIGS. 10 and 11 which correspond to FIGS. 8 and 9 and in which primed reference numerals are used. Putting the pressure actuated device on the high pressure side of the system the responsive device is subject to a magnified pressure when a correspondingly improved accuracy is controlled. For a similar reason it is desirable to place the bleed port on the high pressure (primary heat exchanger) side of the system, with the latter having the additional advantage that, by bleeding action, the pressure in the secondary heat exchanger can be reduced to below atmospheric, thereby extending the lower end of the heat rate range to less than that of a corresponding "open" system in which the secondary heat exchanger connections are open to the atmosphere.

Bleeding of air may be also controlled by the temperature in the enclosed space as illustrated in FIG. 12, where corresponding reference numerals carry subscript f. In this embodiment the bellows 93f, which controls the position of the bleed plunger 112f, is under the control of a temperature sensing bulb 91f. Thus after the system has been charged to a high pressure by aspiration, using the manual level 70f, air is correctively bled thereafter until the temperature achieves a valve which has been set on the control knob 97f.

In accordance with one of the more detailed aspects of the present invention momentary closure of the butterfly valve may be achieved, as shown in FIGS. 15, 15a, 15b, by means of a mechanical one-shot plunger arrangement 130. The manual plunger in the present instance includes two portions 131, 132 which are hinged centrally at 133 and which are kept in normal alinement with one another by a tension spring 134. The plunger is restored to its outer position by means of a return spring 135. A crank 136 is interposed between the plunger and the butterfly valve, the crank having a pocket 137 for receiving the tip of the plunger as well as a disabling arm 138.

Thus when the plunger is manually depressed, as shown in FIG. 11a, the plunger, engaged with the pocket 137, rotates the butterfly valve around to closed position, following which the disabling arm 138 strikes the face of the plunger to press the tip of the plunger out of the pocket 137. Since the plunger and butterfly valve are thus effectively disengaged from one another, the butterfly valve is free to return to open position under the urging of biasing spring 64g as set forth in FIG. 11b. The momentary closure of the butterfly valve causes a small amount of air to be aspirated through the injector valve 75g. Successive actuations of the plunger are required to provide separate increments of aspirated air. The arrangement is particularly effective in the case of an automobile air conditioner where the user can be instructed to press the plunger a number of times depending upon the desired amount of lowering of the temperature. The temperature may, conversely, be raised by pressing a manual bleed valve 110g as described in connection with an earlier embodiment.

In the above embodiments a rotary solenoid actuated by electrical contacts, is utilized for rotating the blocking valve into and out of its blocking condition. However in accordance with one of the aspects of the invention this same function may be provided by a pneumatic actuator under the control of a pneumatic control valve directly operated by temperature or pressure. Referring to FIG. 13, system elements corresponding to those in FIG. 2 have been given corresponding reference numerals with addition of subscript h. However instead of the temperature respective bellows being used to actuate electrical contact, it is used to position the plunger of a pneumatic control valve 140. Such control valve is of the three-way type having an inlet port 141, a control port 142 and and exhaust port 143. Mounted in the valve body is a valve sleeve 144 having diametrically opposed pairs of openings 145, 146 and an adjustable biasing spring 147. For positioning the sleeve in accordance with temperature, the sleeve is engaged, at its left-hand end, by the arm 99h which was actuated by the bellows.

Slidably mounted within the sleeve is a plunger, or spool, 150 having angular grooves 151, 152 for the purpose of conducting pneumatic fluid and which define adjacent land services. The spool 150 is connected to the dashpot plunger 102h by means of an adjustable connection 153.

A pneumatic actuator of the vane type is connected to the control port 142. Such actuator, indicated at 70h, as a port 71h and a vent 72h. The actuator is sector-shaped in profile, having an internal swingable vane 73h hinged at 74h at its left-hand end. Return spring 64h urges the vane 73h normally against an internal stop 65h.

The operation of the pneumatic control arrangement will be apparent upon considering FIGS. 13a and 13b.

First of all, FIG. 13 shows the valve 140 in its closed off position corresponding to temperature equilibrium. When the bellows "calls for" by expanding, the plunger 144 is shifted to the right (FIG. 13a) providing communication between the alined ports 145 and the sleeve and the groove 151. This permits pressurized air to flow from the source through control port 142 and into the inlet port 71h of the actuator, swinging the vane 73h therein clockwise which rotates the butterfly valve into blocking condition. As previously understood, this opens the check valve 75h admitting a shot of air into the conduit 61h on the low pressure side of the system. Closure of the blocking valve, however, immediately increases the pressure on downstream side of the valve causing movement of the diaphragm 101h and dashpot plunger 107h to the right, moving the plunger or spool, of the control valve to the right, immediately shutting off the flow of pressurized air. Indeed the plunger 150 moves far enough (FIG. 13b) to aline groove 152 therein with the ports 146, thereby connecting the control port 142 to the atmosphere, depressurizing the actuator 70h so that the vane 73h therein is restored to its initial condition (shown in FIG. 14) by the spring 64h. Opening the butterfly blocking valve and closing the injector valve 75h thereby restoring the system to its normal state, but at a slightly higher pressure due to the added air. When the plunger 150 reaches the leftword limit of its stroke, limited by stop 83h, communication may be re-established between groove 151 and ports 145 on the sleeve, if the thermostat bellows is still calling for cold, resulting in repetition of the cycle. Thus air is added to the system in small increments, building up the pressure, and heat rate, until the space cools off sufficiently so that the thermostator no longer calls for cold and the system achieves equilibrium conditions set forth in FIG. 13.

The opposite occurs when the controlled space becomes too cold. The latter causes clockwise rotation of the arm 99h which results in movement of the valve sleeve 144 to the left and movement of the bleed plunger 12h in the same direction. The movement of the valve sleeve is idle, but the movement of the bleed plunger 112h causes slow bleeding of air from the system, reducing the heat rate, and increasing the temperature of the controlled space, until the bellows 93h responds by shutting off the bleed.

While the operation of the pneumatic control system shown in FIG. 13 is analogous to the electrical system of FIG. 2, it will be noted that the system of FIG. 13 had certain inherent advantages, both in the refinement of the control function and in the elimination of electrical components and contacts for controlling the same.

In all of the preceding embodiments, it may be noted, air is aspirated directly into the system to increase the operating pressure and bled into the ambient atmosphere to decrease the operating pressure either under manual or automatic control. In accordance with one of the aspects of the present invention the injected air may be furnished from an auxiliary pressurized source such as a pressurized accumulator. Further in accordance with the invention the auxiliary pressurized source is coupled, by valving, to the respective heat exchangers, with the pressure in the source, or accumulator, being intermediate the pressures in the heat exchangers to enable flow of the auxiliary, or added, air captively into and out of the refrigeration system.

Thus referring to FIG. 16 an accumulator 160 in the form of a small pressure tank is provided having a valved opening 161 for replenishment purposes. The accumulator is connected to the system by means of a three-way valve 170 having a first connection 171 with the primary heat exchanger HX1, a second connection 172 with the secondary heat exchanger HX2 and a common connection 173. The valve 170 is provided with an arm 174 for manual rocking from the illustrated position of shut-off to end positions in which the accumulator is alternatively connected to the primary and secondary heat exchangers.

Let it be assumed that the accumulator 160 has an initial charge of air which is at a pressure less than the pressure of the primary heat exchanger but greater than the pressure of the secondary heat exchanger. If it is desired to reduce the pressure in the system and thereby reduce the heat rate, the valve 170 is rocked clockwise so that the primary heat exchanger is connected, via ports 171, 173 to the accumulator. Since the primary heat exchanger is at superior pressure, air will bleed from the primary heat exchanger until the pressure gauge PG indicates that the desired pressure has been obtained following which the three-way valve 170 is restored to the illustrated off position. It is to be noted that the air which is bled from the system is not idly discharged to the ambient atmosphere but such air is, instead, conserved under pressure in the accumulator.

Conversely, when it is desired to increase the system pressure and thereby increase the heat rate, the valve 170 is rocked in the counterclockwise direction to connect the secondary heat exchanger to the accumulator via ports 172, 173. Since the pressure in the accumulator is greater than that existing in the secondary heat exchanger, air will flow from the accumulator into the system thereby raising the system pressure, and heat rate, with the injected air being cut off when the pressure gauge shows that the desired higher level of pressure has been achieved.

For convenience the operating handle 174 may be provided with centering springs 175, 176 as illustrated in FIGS. 16a, 16b. Thus when it is desired to give the system a "shot of air", manual force is applied to the handle 174 in the direction shown in FIG. 16b, overcoming the force of the centering springs, and with automatic restoring movement of the valve to its blocked position being assured. The desired degree of bleed is obtained by moving the manual lever 174 against the spring force in the opposite direction. The "feel" provided by the centering springs and the automatic restoration which is inherent in the use of such springs makes the control system of FIG. 16 ideally suited to a simple form of automobile air conditioner having a wide range of thermal capacity. To protect the system against over-pressure, a relief valve or pneumatic fuse such as that illustrated at 116 (FIG. 2) may be used.

Since bleed air is conserved in the system shown in FIG. 16 the air which is stored in the accumulator 160 can be expected to last for a long time. Nevertheless when replenishment is necessary because of accumulated leakage, the accumulator may be brought up to rated pressure by applying a filling station air line to the nipple 161 which preferably incorporates a conventional valve stem.

Alternatively, the accumulator 160 may be charged by making use of aspirated air, using a manual aspirating assembly 180 as illustrated in FIG. 17. Here the conduit 181 leading from the secondary heat exchanger includes a butterfly valve 182 having a manual operating arm 183 with a return spring 184 and stop 185. When it is desired to replenish the accumulator the valve 170 is rocked to connect the accumulator to the primary heat exchanger. The butterfly 182 is then rocked into blocking position producing aspiration through a check valve 186. The aspirated air is pressurized in the compressor and fed from the compressor outlet port 42 through the valve port 171 into the accumulator. For convenience the accumulator may be equipped with a pressure gauge to indicate when the accumulator is at rated pressure, at which time the butterfly valve may be restored to its illustrated position.

While the use of a pressurized accumulator has been described above in connection with a manually controlled system, an accumulator is ideally suited to automatic control by thermostat, for example of the fluid or bellows type, as shown in FIGS. 18 and 19 of the drawings. In this embodiment of the invention a modified form of three-way valve is used, preferably a spool valve, 190 having connections 191, 192, 193. The valve has a spool 194 with lands 195, 196. For thermostatic control of the valve spool a thermostat 200 is provided having a bulb 201, a capillary 202 and a bellows 203, the bellows being mounted upon an arm 204, cantilever mounted at 205 and having an adjusting cam 206 mechanically connected to a control knob 207. The valve ports 191, 192 are connected to the respective heat exchangers while the valve port 193 is connected to an accumulator 208. For the purpose of tailoring the speed of response of the control system to the slower responsive of the enclosed space and its thermostat, restricted orifices 211, 212 are respectively provided in the lines 191, 192.

Under equilibrium conditions, with the temperature in the space at the set point, the valve spool 194 occupies a position illustrated in FIG. 18b in which all of the valve ports are blocked. Upon an increase in the temperature of the bulb 201, the bellows 203 is expanded as illustrated in FIG. 18a, moving the valve spool upwardly and connecting the accumulator to the port 192 which leads to the secondary heat exchanger causing additional air to flow, at a slow rate because of the restriction 212, from the accumulator into the system.

Conversely when the temperature of the bulb 201 of the thermostat drops, resulting in contraction of the bellows 203 as illustrated in FIG. 18c, the valve port 191 is uncovered permitting the bleeding of air from the primary heat exchanger through the restricted orifice 211 to the accumulator, thereby reducing the system pressure, and reducing the heat rate, so that the temperature in the enclosed space rises again to the equilibrium level of FIG. 18b.

In accordance with one of the more detailed aspects of the present invention the valve 190 is provided with an auxiliary venting port 213 which is connected to the port 191 and which has a restricted orifice 214. Thus in the case of an extremely light thermal load upon the system it may not be possible to secure enough bleeding of the system into the accumulator, that is to say, the accumulator pressure may build up to a level approaching that of the primary heat exchanger, resulting in an undesirably low temperature in the enclosed space. In the event that this condition, illustrated in FIG. 18d, should occur, the port 213 is uncovered causing bleeding of air from the system through orifice 214 directly to the ambient atmosphere. This reduces the system pressure during the time of light loading restoring the temperature of the space to the equilibrium level illustrated in FIG. 18b.

Means are provided, as illustrated in FIG. 19, for automatically replenishing the system, and hence the accumulator, in response to a drop in the pressure of the accumulator below a predetermined minimum level. Such replenishing means, indicated at 220, correspond substantially to that illustrated in FIG. 6, and corresponding reference numerals are used with addition of subscript g. Interlock contacts 221 preclude replenishment except when the system is in the condition corresponding to FIG. 18a.

In accordance with the present invention in one of its aspects the pressure of the system is controlled by a pressure regulating valve of the reducing type which has its input connected to a source of high pressure and which has its output connected to the loop circuit for automatic injection of air to bring the pressure constantly up to the adjustably set level. Further in accordance with the invention a relief valve is associated with the pressure regulator for bleeding of air upon reduction in the setting of the regulator. Referring, then, to FIG. 20 there is shown a regulator 230 of the pressure reducing type having a high pressure inlet connection 231 and a relatively lower pressure outlet connection 232, the latter being connected by a line 233 to the secondary heat exchanger. The pressure regulator has a cup-shaped frame 234 enclosed by a diaphragm 235 to define a central space 236 which communicates with the outlet connection 232.

The inlet connection 231 extends within the space 236 terminating in an orifice 237. However, flow from the orifice is normally blocked by seating the orifice upon a valve seat 238 which is supported upon a yoke 239 connected to the diaphragm. The valve seat is pressed toward the orifice by an auxiliary spring 240 and by the effect of the pressurized air in the space 236. This combined force is, however, opposed by a main spring 241 which presses against the outside of the diaphragm and which is compressed by an adjusting screw 242 coupled to a calibrated control or setting knob 243.

In operation, with the control knob 243 set to compress the main spring 41, with the rotor 40 rotating, and with the valve V in the accumulator supply line open, compressed air passes through the inlet opening 231 and out of the orifice 237 into the central space 236 of the regulator. When the set level of back pressure builds up in the space 236 it presses the diaphragm upwardly to cut off further flow. However, any subsequent reduction in pressure at the point of connection with the pressurized loop, that is to say, any subsequent drop in pressure within the central space of the regulator causes the calibrated spring 241 to expand against the diaphragm thereby cracking open the orifice 237 so that additional air is admitted, through the regulator, to the system.

It is characteristic of conventional pressure reducing valves that they can only increase, and not decrease, the pressure at the output connection. Consequently, to bring about a decrease in system pressure, an adjustable relief valve is provided. This relief valve, indicated at 250, has an inlet connection 251 and a vent 252. The relief valve, as illustrated, has a cup-shaped frame 254 enclosed by a diaphragm 255 to define a central space 256. The inlet connection 251 terminates in an orifice 257 which seats against a valve seat 258 which is mounted directly upon the diaphragm.

Pressing upon the top surface of the diaphragm is a main spring 261 which is compressed by an adjusting screw 262 which is adjusted by a calibrated control knob 263. The control knob 263 is adjusted to a level which is slightly higher than that of the control knob 243 on the regulator, the two control knobs being adjusted upwardly and downwardly substantially in unison with one another but with a slight constant offset between them. This permits manual adjustment of system pressure both upwardly and downwardly.

In accordance with one of the aspects of the present invention a single control may be provided (FIG. 21) for simultaneous adjustment of the pressure regulator valve 230a and pressure relief valve 250a and both of the valves may be made jointly responsive to temperature. Thus a thermostat 270 is provided having a bulb 271, a capillary 272 and a bellows 273, the latter being supported upon an arm 274 anchored at one end 275 and which is positioned by a cam 276 under the control of an adjusting knob 277. A yoke 278 is provided for transmitting the motion of the bellows 273 evenly to both of the main spring 241a, 261a. It will be understood that the yoke 278 represents only a rudimentary means for transmitting the straight line movement of the bellows and suitable precaution will be taken in a practical design to insure that the two springs 241a, 261a are subjected to equal amounts of movement, with differential adjustment being achieved by a set screw 279 or equivalent.

As in the preceding thermostatically controlled embodiments, it is desirable to include a restriction 280 in the air injection line 233a in order to tailor the response of the control system to the response of the enclosed space and its thermostat. Instead of injecting air at the secondary heat exchanger the pressure regulating valve may be connected to the primary heat exchanger, at point 233b, especially if subatmospheric pressure is present in the secondary heat exchanger.

When the system is in operation at the level of temperature set on the control knob 277, the valve seats 238a, 258a are both seated on their respective orifices and no air flows through the injection line 233a. When the temperature in the enclosed space rises slightly so that the thermostat 270 "calls for cold", the bellows 273 expands thereby applying incremental pressure to the main springs 241a, 261a. Such incremental pressure does not affect the relief valve 250a except to cause it to seal more tightly, but the incremental pressure applied to the spring of the regulator valve 238a cracks open the inlet orifice 237a causing an increase in pressure in the central space 236a. This increases the system pressure via line 233a and, in addition, increases the pressure on the underside of the diaphragm 235a to shut off further flow.

Conversely, a lowering of temperature in the enclosed space below the set value contracts the bellows 273 reducing the compressive force in the main springs 241a, 261a. The latter has no direct effect upon the regulator valve 230a except to close the seat therein more tightly, but a reduction in the force in the spring 261a of the relief valve causes the seat 258a to lift slightly thereby producing a slight leakage of air until the pressure in the line 233a, and hence in the system, has been reduced to the lower level following which no further leakage takes place.

While the operation of the valving in FIG. 21 has been described in connection with an increase and decrease in the temperature detected by the thermostat, it will be understood that respective injection and bleeding of air will occur in similar fashion upon rotation of the adjusting knob 277 in one direction or the other.

In accordance with a still further aspect of the present invention an air pump, close coupled to the shaft 50 of the rotor may be provided for constant replenishment of the accumulator in the systems of FIGS. 20 and 21. Such pump 280, preferably of small volumetric capacity but of the positive displacement type, is connected to the rotor shaft 50 by means of a mechanical connection 281. Interposed between the output of the pump and the accumulator is a relief valve 282 and a check valve 283, with the result that pressurized air is added to the accumulator only when the pressure falls below the setting of the relief valve.

In order to make it unnecessary for the auxiliary pump 280 to operate constantly, the pump may be driven by a separate motor 284 controlled by a pressure switch 285. Thus when the pressure in the accumulator drops to a point which is capable of triggering the pressure switch, the motor 284 is turned on causing the pump 280 to pump additional air into the accumulator until the pressure in the latter rises to the point of turn-off.

For the sake of consistency and easy understanding all of the modifications described above have been directed toward achievement of cooling effect, with the secondary heat exchanger HX2 thermally coupled to the enclosed space. However, the invention is not limited to utilization of the cooling effect, and the system may be employed, as a heat pump, for its heating effect simply by coupling the primary heat exchanger, rather than the secondary heat exchanger, to the enclosed space and by reversing the "sense" of the thermostat, as covered below so that a decrease in temperature brings about a corrective increase in pressure and vice versa, a matter well within the skill of the art.

Also in the above embodiments separate, but coordinated, means have been used for injection and bleeding of air. In accordance with the invention, however, the functions may be combined into a single air pump of the positive displacement type having one of its ports connected to the loop and which is driven by a reversible motor. Thus referring to FIG. 24 there is disclosed an air pump 300 having ports 301, 302, the port 301 being connected to the compressor inlet port 31 (FIG. 1) by an injection-bleed conduit 303. The pump has a mechanical connection 304 to a motor 310 having forward and reverse connections 311, 312, with a common connection 313 which is connected to a source of current 314. Manual switches 315, 316 may be interposed in series with the motor connections 311, 312 for increasing and decreasing the pressure and hence the heat rate of the system.

Thus, upon pressing the switch 315 the motor rotates the pump in a direction to draw air inwardly through port 302, with the air being discharged under pressure from the port 301 via the conduit 303 into the loop. The switch 315 is maintained depressed until the desired pressure is built up in the secondary heat exchanger side of the loop as indicated by a pressure gauge 317. It will be understood that the pump 150 is not only of the positive displacement type but is "non-reversible" in the sense that it cannot act as an air motor under the influence of the pressure in the loop. This can be accomplished by including an irreversible drive 305, for example, of the worm type, in connection 304. Once the pump builds up pressure in the system to the desired level, and the switch 315 is released, the pump is capable of holding the air at the set pressure level until there is an intentional change in pressure.

Where it is desired to reduce the pressure and hence the heat rate of the system, the companion switch 316 is pressed thereby energizing the motor for rotation of the pump in the opposite direction, the pump serving to bleed air from the loop via conduit 303, with the air being vented into the atmosphere at port 302.

Further in accordance with the invention, means are provided for sensing the temperature in the enclosed space and for producing an output signal as the temperature varies above and below a set level. Means responsive to the output signal are provided for rotating the motor, and hence the pump, in opposite directions to bring about a corrective change in system pressure.

Thus, referring further to FIG. 24 and assuming summer conditions, a "summer" thermostat 320 is provided including a bulb 321, a capillary 322 and a bellows 323, the bulb and bellows being charged with a vaporizable fluid. The bellows is secured to an adjustable mount 324 positioned by a cam 325 which is under the control of a setting knob 326. Connected to the free end of the bellows is a switch 330 having a first contact 331 and cooperating contacts 332, 333 in straddling position, the contacts being respectively connected to the motor forward and reverse contacts 311, 312. A switch 334 serves as a "season" switch with summer contact S closed.

In the event that the temperature in the space rises above the level set by the control 326, the increase in temperature, causing expansion of the bellows 323, results in a temperature signal in the form of upward movement of the contact 331 until the contact 332 is engaged, thereby energizing the forward contact 311 of the motor which results in rotation of the pump 300 in such a direction as to pump, or inject, air into the system via the conduit 303, thereby to increase the heat rate of the system so that greater cooling effect is correctively produced in the indoor heat exchanger HX2 (FIG. 1) tending to bring the temperature down to the set level.

However, in accordance with one of the final, nevertheless important, features of the present invention, a pressure follow-up signal is generated which is effectively bucked against temperature signal to secure proportional response to the temperature error signal. Thus, we provide an adjustable follow-up control 340 having a capillary 342 leading from the loop to a follow-up bellows 343 or equivalent device responsive to system pressure. To facilitate adjustment the bellows 343 is mounted upon a flexible mount 344 positioned by a cam 345 under the control of a setting knob 346. Thus, upon an increase in loop pressure resulting from contact between contacts 331, 332, the bellows 343 expands thereby producing a pressure signal lifting the upper contact 332 from contact 331 and, by its bucking effect, breaking the circuit to the pump motor 310. The breaking of contact prevents any undue build-up of pressure and permits the system to operate at an augmented heat rate for additional cooling effect. As the temperature drops toward the set point, the pressure is, by making of contacts 331, 333, gradually reduced to prevent overshoot of the temperature in the lowering direction. The so-called "dead band" may be adjusted by adjusting the spacing between contacts 332 and 333.

The converse operation occurs in the event the temperature in the space should go below the set level. Specifically a drop below set level causes contraction of the bellows 323 and the making of contacts 331, 333, causing the motor 310 to rotate in the reverse direction so that air is bled from the system by pumping out a slow rate with venting at the port 302, an accumulator A being optional. The reduction in system pressure causes contraction of the bellows 343 and the lowering of contact 333 so that it is disengaged from the thermostat contact 331 before the system pressure becomes excessively low. The system then operates at a reduced heat rate until the temperature in the enclosed space rises which, by making of contacts 331, 332, causes a progressively increased pressure until the temperature is restored to the set level, again, with overshoot being avoided by the follow-up action.

Automatic control of the temperature occurs in a completely analogous fashion under winter conditions with the "winter" W being closed and the "summer" switch S being opened. For winter usage the primary heat exchanger HX1 is used in the enclosed space, the transfer being effected, if desired, by transfer valves as taught in my copending application Ser. 733,751 filed Oct. 26, 1976. Corresponding parts in the winter temperature control system are indicated by corresponding reference numerals with addition of subscript "a". It will suffice to say that, under winter conditions, a drop in temperature at the bulb 321a, acting upon the switch 330a, causes the motor 310 to drive the pump 300 in its forward direction to increase the heat rate, while an increase in the temperature of the enclosed space has the opposite effect. Because of the action of the follow-up assembly 340a overshoot of temperature in both directions is prevented in winter as well as summer operation.

It is, finally, one of the aspects of the present invention to provide means for varying the speed of at least one of the fans 52, 53 in accordance with the pressure in the system. Referring to FIG. 24, in which the motor of the fan 53 is indicated at 350, a speed regulator 351 of known type is interposed in the supply lines 352. The adjusting shaft of the speed regulator, indicated at 353, is coupled to the adjusting knob 277 of the combined pressure regulator and relief valve. The phasing is such that when the control knob 277 is turned to produce a higher system pressure the speed regulator 351 is adjusted, via the connection 353, to produce a higher rotative speed for the fan 53. This adjusts the speed of the air current in accordance with the amount of heat to be handled.

If desired, the speed of the fan motor may be proportioned to the pressure existing in the system by employing a pressure-resistance transducer of the carbon pile type in which the resistance is inversely related to the applied pressure. In the present instance such transducer, indicated at 355 in FIG. 26, includes a diaphragm 356 defining a space 357 which is in communication with the line 233a and which has a carbon pile 358. The higher the system pressure, that is to say, the higher the pressure in line 322a, the more the resistor element 298 is compressed and the lower is its resistance. Assuming that the resistance element, or pile, 358 is in series with the motor, the greater the system pressure the higher the motor speed and vice versa.

Air has been mentioned as the preferred refrigerant in the above discussion and is especially desirable where there is replenishment from the ambient atmosphere and venting or bleeding to the atmosphere. However, it will be apparent that the invention is not limited to use of air as the refrigerant and other compressible gases may be employed, so that the term "air" is to be interpreted in a general sense.

One of the advantages of the above pressurized closed system is that the system may be charged with a quantity of lubricant for lubricating the vanes and the rollers for guiding and supporting the vanes. Where water is employed to reduce the driving requirement and to enhance the coefficient of performance as taught in the U.S. Pat. Nos. 3,904,327 and 3,956,904 mentioned above, lubricant may, if desired, be in emulsified form.

The term "accumulator" as used herein, refers, in its simplest form, to an air tank or reservoir for pressurized air, and it is one of the features of the invention that, space requirement permitting, an accumulator may be used which is of a size permitting operation for week or months without replenishment. On the other hand the accumulator may, if desired, be quite small and may consist of nothing more than a volume of the piping itself.

Although it is preferred to employ a unitary compressor-expander of the positive displacement type, it will be understood that, if desired, the compressor and expander portions may be separate even though mechanically coupled together, without departing from the present invention. And while flat radially-sliding vanes are used in the preferred embodiment, it will be understood that the term "vane" as used herein refers to any means for forming enclosed compartments which are progressively contracted and expanded as the rotor is driven.

The term "pressure in the loop", it will be understood, refers to a pressure condition existing in the loop and not, of course, to the existence of a particular pressure around the loop. The term "momentarily" as used herein does not imply instantaneous action and the term is intended to cover any relatively short interval of time.

In carrying out the present invention it is preferred to employ rotary solenoids of the type manufactured and widely distributed under the trade name "LEDEX" and which are capable of producing a powerful stroke of rotary movement between predetermined limit positions. However, it will be understood that the term "solenoid" as used herein is not limited to any particular form of solenoid, rotary or otherwise, but includes any electrically operated means for shifting the blocking valve between its open and closed positions.

As stated, the system is ideally suited to "winter-summer" operation and control by the simple expedient of switching of heat exchangers, either physically or by valving, between the enclosed space and the ambient atmosphere and by reversing the sense of the temperature responsive element. Because of the wide range in heat rate which may be achieved by the present system both winter and summer conditions can be easily accommodated, with an equilibrium pressure in the secondary heat exchanger of, say, two atmospheres in summer and four to five atmospheres in winter. The term "enclosed space" as used herein refers to any region which is being controllably heated or cooled, and the term "air conditioning system" refers equally to means for bringing about the heating or cooling.

In the various embodiments of the invention discussed above a bellows has been described and illustrated as a transducing element, with the motion of the bellows being utilized as an output signal representative of the condition, usually pressure, which is being responded to. However, it will be understood by one skilled in the art that this has been done simply for ease in understanding and that the invention is by no means limited to a bellows as a transducing element, and other types of transducers capable of producing an output signal, which varies in accordance with changes in a condition, may be utilized.

In the embodiments discussed above the compressor side of the compressor expander is utilized to compress the additional air which is injected into the system for increase in heat rate while keeping the expander in operation. This involves a certain element of risk because of the increased differential pressure across the vanes. Such pressure differential may be substantially reduced, during charging, by opening a bypass valve extending from the expander inlet port to the expander outlet port. Such a valve is indicated at 360 in FIG. 1. Conveniently the valve 360 may be a solenoid operated valve in which the valve opens upon energization of supply lines. Thus the line supplying the valve 360 may conveniently be connected in parallel with the terminals 71, 72 of the solenoid 70 (see FIG. 2) so that the expander side is bypassed coincidentally with closure of the blocking valve 62.

What we claim is:

1. In an air conditioning system for an enclosed space, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of single phase gaseous refrigerant, the refrigerant being constantly in the gaseous stated throughout the loop, one of the heat exchangers being thermally coupled to the enclosed space, control means for producing an output signal in response to a change in the temperature of the controlled space, a source of said single phase gaseous refrigerant, heat rate control means for changing intermittently the heat rate of the system while maintaining the refrigerant in a gaseous phase throughout the loop under all operating conditions, said heat rate control means including means for progressively injecting said single phase refrigerant from the source into the loop to increase the pressure in the secondary heat exchanger to substantially above the atmospheric level, control means including a control device correctively settable in response to the temperature of the air in the enclosed space to produce a control signal for intermittently energizing the injecting means to inject such single phase gaseous refrigerant into the loop to increase the pressure in the loop and thereby increase the heat rate of the system, and bleeding means for progressively bleeding single phase refrigerant from the loop back to the source for decreasing the loop pressure and thereby decreasing the heat rate of the system so that an equilibrium pressure tends to be established in the secondary heat exchanger which is in accordance with thermal load on the system.

2. The combination as claimed in claim 1, the control means being in the form of a thermostat subject to the air entering the enclosed space and the bleeding means being in the form of a small aperture for intentional and gradual leakage of air from the loop.

3. In an air conditioning system for an enclosed space and for operation in ambient air, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, the air being constantly in the gaseous state throughout the loop and free of any phase changing restriction in the form of a capillary or the like, one of the heat exchangers being thermally coupled to the enclosed space, injecting means for progressively injecting ambient air under pressure into the loop to increase the pressure in the secondary heat exchanger to substantially above the atmospheric level thereby to increase the heat rate of the system, control means including a control device correctively settable in response to the temperature of the air in the enclosed space for intermittently operating the injecting means so that ambient air is pumped into the loop to increase the pressure in the loop thereby to increase the heat rate of the system, and bleeding means interposed between the loop and the ambient air and coupled to the control means for progressively bleeding air from the loop back to the ambient air to reduce the heat rate of the system so that an equilibrium pressure tends to be established in the secondary heat exchanger which is in accordance with the thermal load on the system.

4. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, control means including a temperature sensing device for producing an output signal which varies in proportion to the direction and magnitude of the departure of the temperature in the space from a set level, injector means responsive to the output signal for controllably injecting air into the loop to increase the pressure therein thereby to increase the heat rate of the system in accordance with the departure of the temperature from the set level in one direction, and bleed means responsive to the output signal for controllably bleeding air from the loop to decrease the pressure therein thereby to decrease the heat rate of the system in accordance with the departure of the temperature from the set level in the opposite direction.

5. The combination as claimed in claim 4 in which the injection means and bleed means are so constructed that injection and bleeding in response to an output signal from the temperature sensing device take place at a relatively slow average rate substantially tailored to the thermal requirements and hence the response of the enclosed space and its temperature sensing device thereby to prevent overshoot.

6. In an air conditioning system for an enclosed space and for operation in ambient air, the combination comprising a compressor having an inlet port and an outlet port, an expander having an inlet port and an outlet port, the compressor and expander having rotor means including vanes coupled together for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, the air being constantly in the gaseous state throughout the loop and free of any phase changing restriction in the form of a capillary or the like, one of the heat exchangers being thermally coupled to the enclosed space, control means including a temperature sensing device which produces a modulated output signal which varies in proportion to the departure of the temperature in the space from a set level, injecting means coupled to the control means and responsive to the signal therefrom for controllably injecting air into the loop to increase the pressure in the secondary heat exchanger to substantially above the atmospheric level and up to several times the atmospheric level thereby to increase the heat rate of the system in accordance with the departure of the temperature in one direction from the set level, and bleeding means including an orifice in the primary heat exchanger, the bleeding means being connected for response to the modulated output signal from the control means for bleeding air from the primary heat exchanger to the point where the pressure in the secondary heat exchanger is below atmospheric thereby to decrease the heat rate of the system in accordance with the departure of the temperature from the set level in the opposite direction to provide a wide range of modulation of heat rate as a function of the temperature of the sensing device.

7. In an air conditioning system for an enclosed space, the combination comprising a compressor having an inlet port and an outlet port, an expander having an inlet port and an outlet port, the compressor and expander having rotor means inluding vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a pneumatic pressure regulator valve having an input connection and an output connection, a source of air under pressure in communication with the input connection, the output connection being in communication with the loop, the regulator valve being of the type having an adjustable pressure control element with means for controlling the pressure of the air at the output connection to a set value thereby to establish the level of pressure in the loop.

8. The combination as claimed in claim 7 in which the output connection of the regulator communicates with a loop at a point adjacent the compressor inlet port and in which the source of pressure is in the form of a pressurized pneumatic accumulator.

9. The combination as claimed in claim 7 in which a bleed valve is provided for bleeding air from the loop for reduction of pressure in the loop.

10. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a pneumatic pressure reducing valve having an input connection and an output connection, a source of pneumatic pressure in communication with the input connection, the output connection being in communication with the loop, the pressure reducing valve being of the type having an adjustable pressure control element with means for limiting the pressure of the air at the output connection to an adjustably set value, a pressure relief valve connected to the loop and communicating with the ambient atmosphere, the pressure relief valve being of the type having an adjustable pressure control element with means for bleeding air from the loop as long as the pressure in the loop exceeds the set value, the pressure control elements of the pressure reducing valve and the pressure relief valve being coupled together for movement in unison thereby to vary the pressure in the loop both upwardly and downwardly.

11. In an air conditioning system for an enclosed space, the combination comprising a compressor having an inlet port and an outlet port, an expander having an inlet port and and outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a pressure regulator valve having an input connection and an output connection, a source of air under pressure in communication with the input connection, the output connection being in communication with the loop at a point adjacent the compressor inlet port, the regulator valve being of the type having an adjustable pressure control element with means for adjustably establishing the pressure of the air at the output connection, control means including a temperature sensing device located in the enclosed space and coupled to the pressure control element for adjusting the pressure control element thereby to vary the heat rate of the system correctively as a function of temperature.

12. The combination as claimed in claim 11 in which a restriction is interposed between the outlet connection of the pressure regulator valve and the loop for the purpose of slowing the response of the pressure regulator valve so that it is more nearly comparable to the response of the temperature sensing device and enclosed space, thereby to prevent overshoot.

13. The combination as claimed in claim 11 including a pneumatic pump having means for driving with the rotor means, the pump communicating with the source of air for replenishing the same and for maintaining the accumulator above a predetermined high pressure.

14. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, control means including a temperature sensing device for producing an output signal which varies in accordance with the departure of the temperature in the space from a set temperature level, injecting means coupled to the control means and responsive to the signal therefrom for injecting air into the loop to increase the pressure in the secondary heat exchanger to substantially above the atmospheric level thereby to correctively increase the heat rate of the system in accordance with the departure of the temperature in one direction from the set temperature level, follow-up control means including a pressure sensing device which produces a follow-up output signal which varies in accordance with the resulting departure of the pressure in the loop from a set pressure level, the injecting means being additionally coupled to the follow-up control means and responsive to the signal therefrom to limit the increase of pressure in the system to an amount which depends upon the degree of departure of the temperature, and means for bleeding air from the loop to reduce the pressure therein.

15. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, control means including a temperature sensing device for producing a temperature error signal which varies in accordance with the departure of the temperature in the space from a set temperature level, injecting and bleeding means coupled to the control means and responsive to the error signal therefrom for alternatively injecting and bleeding air into and out of the loop to change the pressure in the secondary heat exchanger thereby to correctively change the heat rate of the system, follow-up means including a pressure sensing device for producing a follow-up control signal which varies in accordance with the resulting change of the pressure in the loop and which is opposite in sense to the error signal, the injecting and bleeding means being additionally responsive to the signal from the follow-up means to limit the change in pressure in the system to an amount which is approximately proportional to the departure of the temperature.

16. In an air conditioning system for an enclosed space, the combination comprising a compressor having an inlet port and an outlet port, an expander having an inlet port and an outlet port, the compressor and expander having rotor means including vanes for positive compression and expansion as the rotor means is driven, a primary heat exchanger connected between the compressor outlet port and the expander inlet port, a secondary heat exchanger connected between the expander outlet port and the compressor inlet port to complete a closed loop having a charge of air, one of the heat exchangers being thermally coupled to the enclosed space, a source of auxiliary air and control means including auxiliary pressurized injector means for controllably feeding air from the source to join that which is already in the closed loop thereby to raise the pressure in the secondary heat exchanger substantially above the atmospheric level thereby to increase the heat rate of the system, the pressure of the source of auxiliary air being greater than the pressure in the loop at the point of injection, means for controllably bleeding air from the primary heat exchanger so that the secondary heat exchanger may operate at a pressure below atmospheric, and means for selectively operating the injector means and the bleeding means to secure a range of heat rate extending both above and below the level of a corresponding system in which the secondary heat exchanger side of the system is open to the atmosphere.

* * * * *